United States Patent
Sheng et al.

(10) Patent No.: US 10,785,459 B2
(45) Date of Patent: Sep. 22, 2020

(54) DLP COLOR PROJECTOR

(71) Applicant: Texas Instruments Incorporated, Dallas, TX (US)

(72) Inventors: Zhongyan Sheng, Allen, TX (US); Gregory Scott Pettitt, Sherman, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/235,883

(22) Filed: Dec. 28, 2018

(65) Prior Publication Data
US 2019/0230326 A1 Jul. 25, 2019

Related U.S. Application Data

(60) Provisional application No. 62/652,951, filed on Apr. 5, 2018, provisional application No. 62/619,457, filed on Jan. 19, 2018.

(51) Int. Cl.
*G03B 21/00* (2006.01)
*H04N 9/31* (2006.01)
(Continued)

(52) U.S. Cl.
CPC ........... *H04N 9/3114* (2013.01); *G02B 5/005* (2013.01); *G02B 5/20* (2013.01); *G02B 26/0833* (2013.01);
(Continued)

(58) Field of Classification Search
CPC .. H04N 9/3114; H04N 9/3111; H04N 9/3152; H04N 9/3164; G02B 5/005; G02B 5/20; G03B 21/00
(Continued)

(56) References Cited

U.S. PATENT DOCUMENTS

| 6,231,195 B1 | 5/2001 | Gutin |
| 2003/0123163 A1 | 7/2003 | Penn |

(Continued)

FOREIGN PATENT DOCUMENTS

WO  2015082529 A2  6/2015

OTHER PUBLICATIONS

International Search Report for PCT/US2019/014401 dated Apr. 25, 2019.

*Primary Examiner* — Jerry L Brooks
(74) *Attorney, Agent, or Firm* — Michelle F. Murray; Charles A. Brill; Frank D. Cimino

(57) ABSTRACT

In described examples, a digital light processing color projector includes light emitters configured to collectively emit light at multiple wavelengths, multiple light directing elements forming an illumination path having at least one aperture stop, a micromirror array coupled to a substrate, an aperture located at the aperture stop, and a filter with a selected color transmittance profile located at or near the aperture stop. The light directing elements are configured to direct light towards the micromirror array as illumination light. An aperture width determines a diameter of the illumination light. A micromirror on-state reflects the illumination light as on-state light. The substrate reflects the illumination light as flat-state light. The light directing elements direct on-state light through the aperture to a projector output. The filter filters flat-state light in an overlap region of the on-state light and flat-state light, or an illumination light portion corresponding to overlap region.

18 Claims, 20 Drawing Sheets

(51) Int. Cl.
  *G02B 26/08* (2006.01)
  *G02B 5/20* (2006.01)
  *G02B 5/00* (2006.01)

(52) U.S. Cl.
  CPC ............ *G03B 21/00* (2013.01); *H04N 9/3111* (2013.01); *H04N 9/3152* (2013.01); *H04N 9/3164* (2013.01)

(58) Field of Classification Search
  USPC .......................................................... 353/84
  See application file for complete search history.

(56) References Cited

U.S. PATENT DOCUMENTS

2005/0264792 A1* 12/2005 Penn .................. G02B 26/0841
  355/97
2013/0229629 A1* 9/2013 Kawamoto .............. H04N 9/31
  353/30
2017/0208302 A1* 7/2017 Katsumata ........... H04N 9/3158

\* cited by examiner

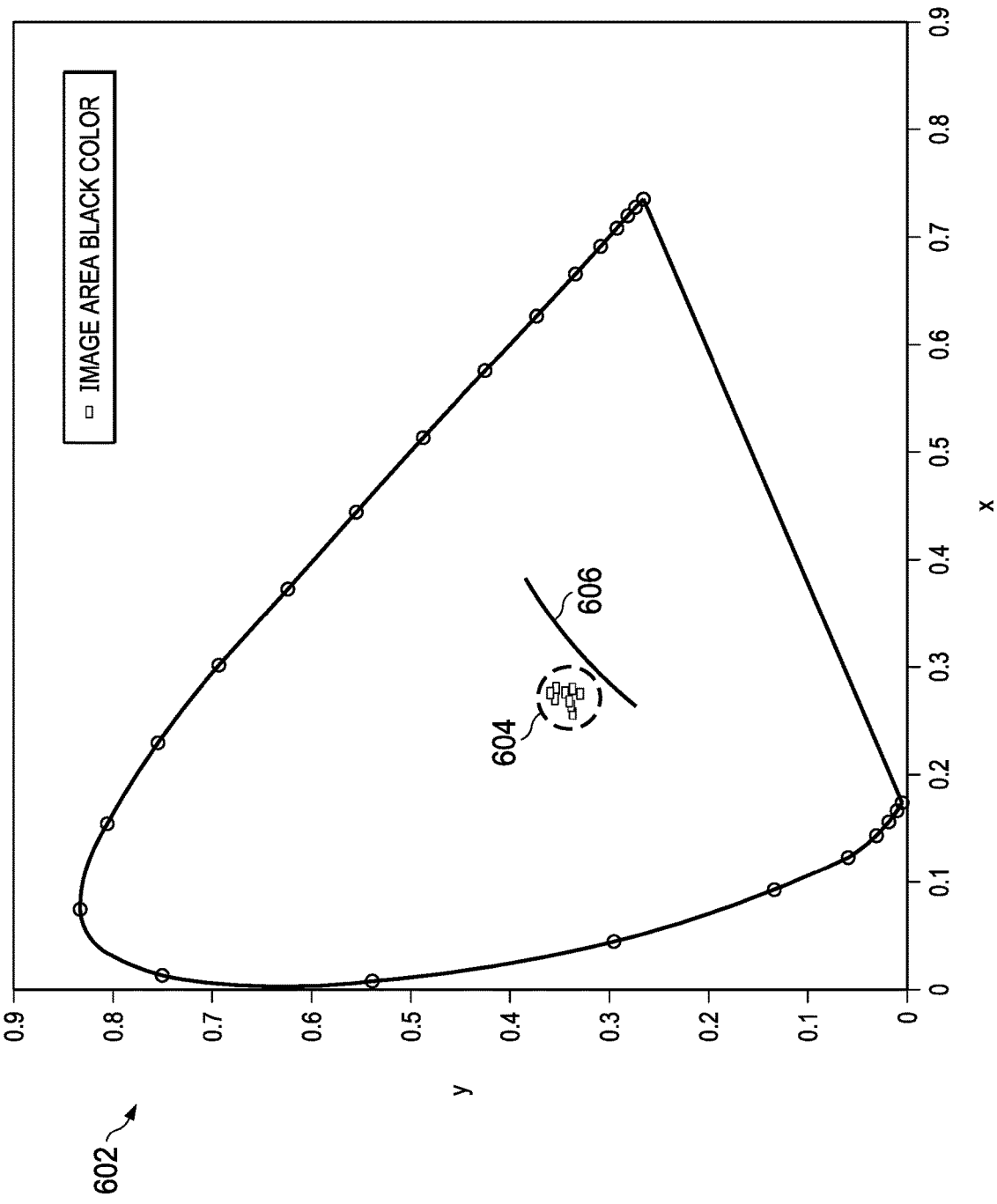

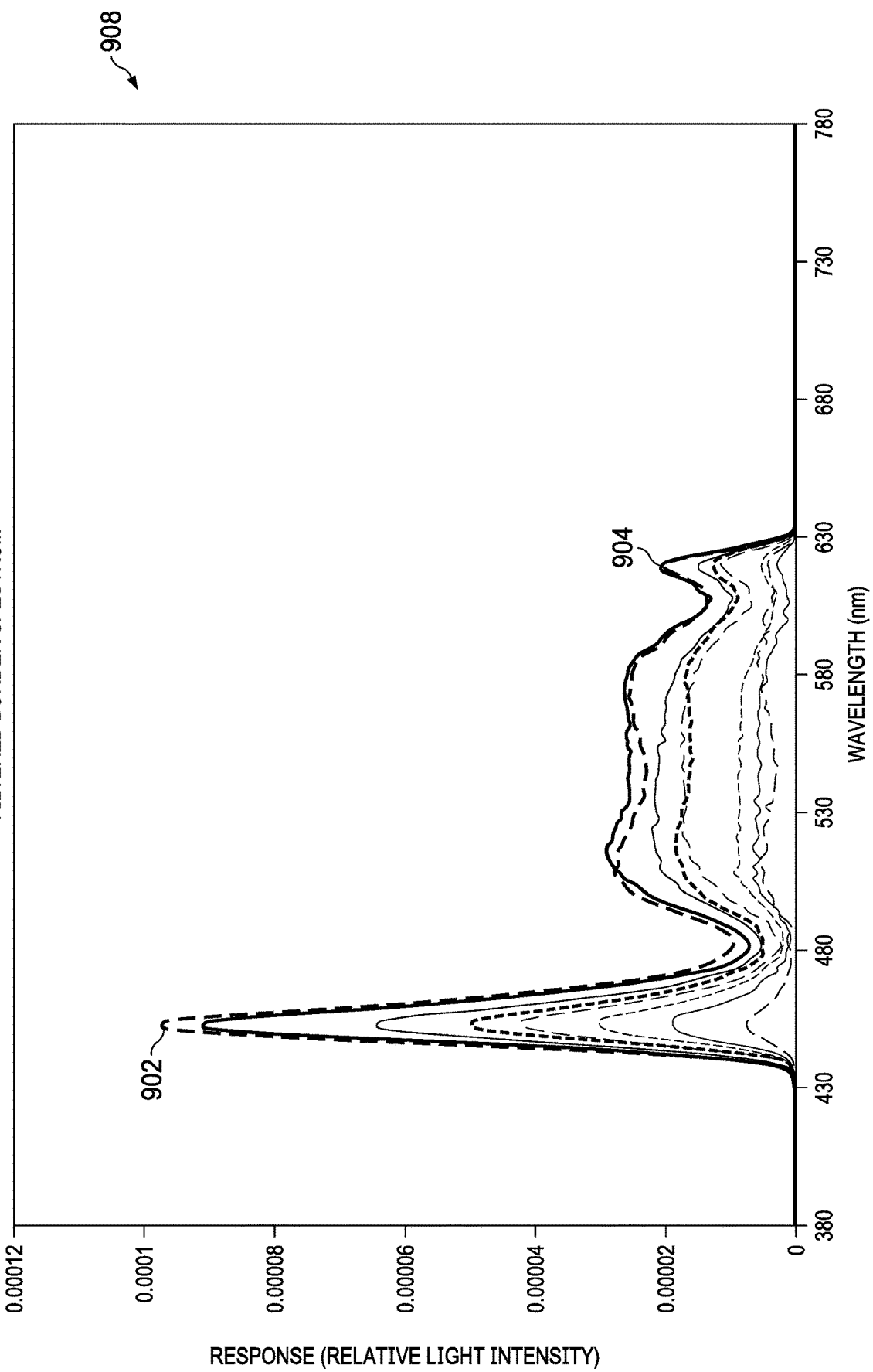

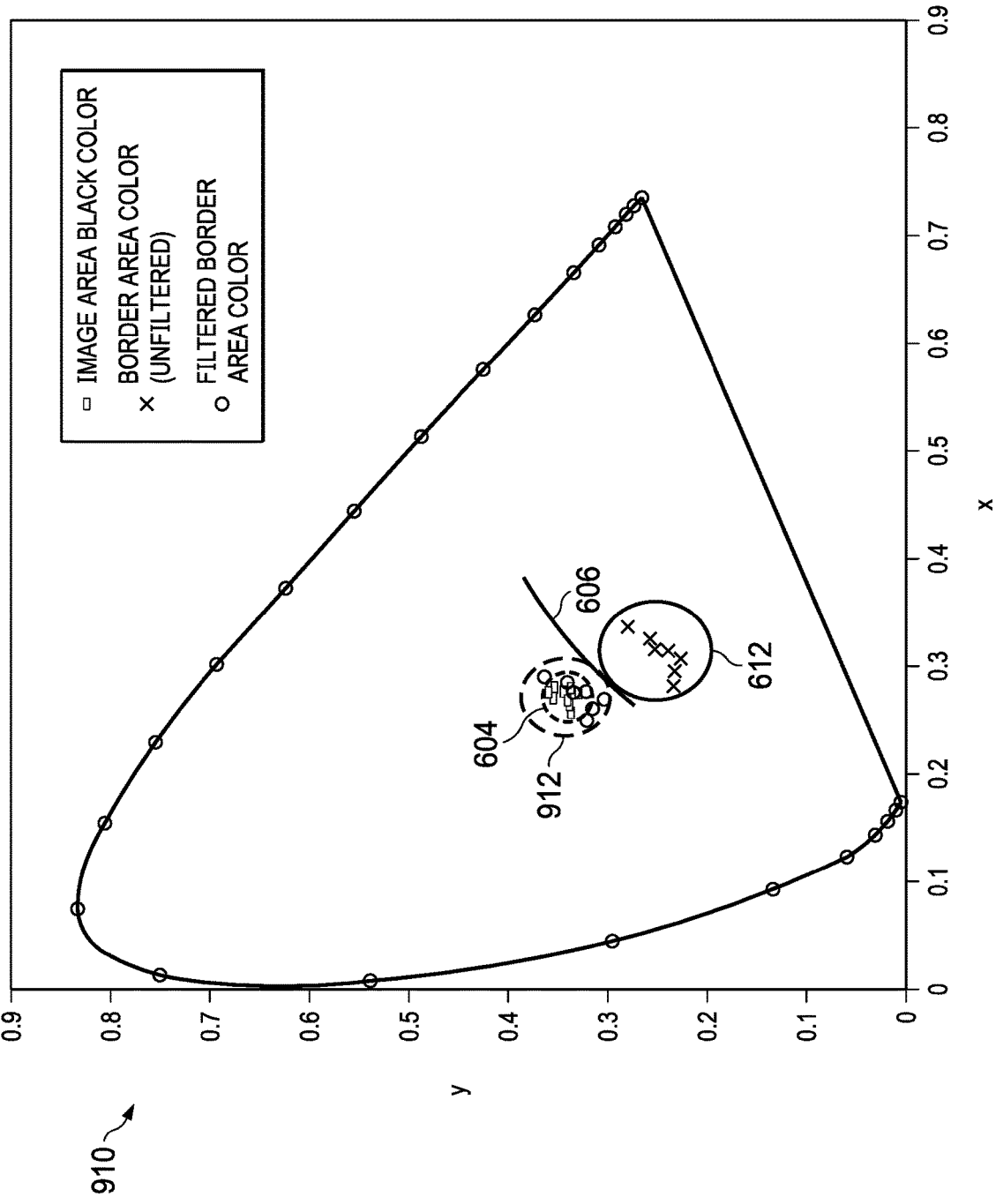

1000

| PARAMETER | BAND | UNIT | VALUE | COMMENT |
|---|---|---|---|---|
| TRANSMITTANCE | 400 nm - 434 nm | % | <= 1.0 | AVERAGE |
| TRANSMITTANCE | 449 nm | % | 50 | +/- 1% |
| TRANSMITTANCE | 464 nm - 607 nm | % | >= 96.0 | AVERAGE |
| TRANSMITTANCE | 622 nm | % | 50 | +/- 1% |
| TRANSMITTANCE | 637 nm - 700 nm | % | <= 1.0 | AVERAGE |
| SLOPE | | nm | <= 12 | 90% TO 10% SLOPE |
| MEASUREMENT ANGLE OF INCIDENCE | | 0 | DEGREES | AVERAGE |

1102 — ILLUMINATING LIGHT HAVING MULTIPLE WAVELENGTHS IS FOCUSED ON A DIGITAL MICROMIRROR DEVICE (DMD)

1104 — A PORTION OF THE ILLUMINATING LIGHT TO PROJECT USING THE DMD IS SELECTED USING ON-STATE MICROMIRRORS OF THE DMD

1106 — A COLOR FILTER WITH A SELECTED COLOR TRANSMITTANCE PROFILE, LOCATED AT AN APERTURE STOP, IS USED TO FILTER LIGHT INCLUDED WITHIN AN OVERLAP REGION, IN WHICH ON-STATE LIGHT AND FLAT-STATE LIGHT OVERLAP

1108 — THE ON-STATE LIGHT, INCLUDING THE (AT LEAST PARTIALLY FILTERED) OVERLAP REGION, IS PROJECTED USING A PROJECTOR LENS

FIG. 11

DLP COLOR PROJECTOR

CROSS-REFERENCE TO RELATED APPLICATION

This application is a non-provisional of, and claims priority to and the benefit of the filing date of: U.S. Provisional Pat. App. Ser. No. 62/619,457, filed Jan. 19, 2018, entitled "Reducing Color Border with Increased Projector Brightness"; and U.S. Provisional Pat. App. Ser. No. 62/652,951, filed Apr. 5, 2018, entitled "REDUCING COLOR BORDER WITH INCREASED PROJECTOR BRIGHTNESS"; which are both incorporated herein by reference.

BACKGROUND

This application relates generally to light projection systems, and more particularly to digital light processing (DLP) color projection systems.

FIG. 1 shows an example layout for a DLP color projector 100, along with example paths taken by light sourced within and emitted from the DLP color projector 100. In DLP color projectors, multiple colors of light are used to illuminate a digital micromirror device 102 (DMD) comprising an array of micromirrors. As shown in FIG. 1, a blue light emitter 104, a green light emitter 106, and a red light emitter 108 (for example, LED bulbs) emit light. A first filter 110 passes only the blue light emitted by the blue light emitter 104, and reflects other colors. A second filter 112 passes only the blue and green light emitted by the blue and green light emitters 104, 106 (respectively), and reflects other colors. Various lenses 114 shape and focus the light and a mirror 116 reflects the light. A first surface of a first prism 118, and a second prism 120, allow the light to pass to illuminate the DMD 102. Light reflected by the DMD 102 is then passed by the second prism 120, and reflected by a second surface of the first prism 118; portions of the light selected by the DMD 102 are reflected by the second surface of the first prism 118 towards a projector lens system 122.

The different-colored light emitters 104, 106, 108 are pulsed to illuminate the DMD 102 with different colors at different times. Different micromirrors in the DMD 102 are turned on ("on-state") or off ("off-state"), for varying amounts of time, to reflect illuminating light towards (on-state) or away from (off-state) the projector lens system 122, respectively—accordingly, towards or away from an output of the DLP color projector 100. In this manner, the micromirrors in the DMD 102 select pattern (positions) and intensity, per illuminating color, of the light output from the projector lens system 122.

An illumination aperture 124, located prior to the DMD 102 in the optical path of the DLP color projector 100 (the optical path is the path taken by light from the light emitters 104, 106, 108 to a screen (not shown) onto which the light is projected as an optical image), can adjust intensity of the light which is incident on the DMD 102 by selecting a portion of the emitted light to pass. An aperture (which, in the illustrated example, is located at a projection aperture stop 126) can adjust a portion of the light reflected from the DMD 102 towards an output lens 128 (from which the DLP color projector 100 outputs light towards the screen). (Aperture stops are further described with respect to FIG. 7A.) An amount of light passed by an aperture stop 124, 126 can be controlled by increasing or decreasing a diameter of an opening in (changing an f-number of) an aperture placed in the optical path at an aperture stop (in the illustrated example, the illumination aperture stop 124 and/or the projection aperture stop 126). The amount of light passed by an aperture (at an aperture stop 124, 126) corresponds to an amount of light available for the DLP color projector 100 to output as projected light. The f-number of an aperture is related to a focal length of the projector divided by the diameter of the aperture. Allowing all light which arrives at the aperture stops 124, 126 to pass a (one or more) corresponding aperture(s) without being blocked assists in maximizing brightness of the projected image; however, this can have drawbacks, as described below.

FIG. 2A shows an example diagram 200 of a light cone 218 incident on a DMD and light cones 212, 214, 216 reflected from the DMD using a relatively narrow aperture (higher f-number). A view 202 is perpendicular to main axes 222, 224, 226, 228 of the light cones 212, 214, 216, 218, so that the light cones 212, 214, 216, 218 travel parallel to the paper (parallel to the plane of the view 202). Accordingly, the view 202 is side-on to the light cones 212, 214, 216, 218. A view 204 is parallel to the main axes 222, 224, 226, 228 of the light cones 212, 214, 216, 218, so that the illumination light cone 218 travels into the paper (into the plane of the view 204), and the other light cones 212, 214, 216 travel out of the paper (outward from the plane of the view 204). (View 204 is in angular space; accordingly, the light cones 212, 214, 216, 218 are shown in FIG. 2A as if parallel to each other at the projection aperture stop 126, which is described below with respect to FIG. 7A.) Accordingly, the view 204 looks down the centers of the light cones 212, 214, 216, 218. Both views 202, 204 show relative angles of the light cones 212, 214, 216, 218 (which typically will differ from actual positioning of light cones 212, 214, 216, 218 within the DLP color projector 100). For clarity, perimeters of light cones 212, 214, 216, 218 are outlined in views 204 (FIG. 2A) and 210 (FIG. 2B), as well as in views 704 (FIG. 7B) and 804 (FIG. 8B). The curved line 230 in view 202 corresponds to the line 232 in view 204, and is included to assist in visualizing the correspondence between views 202 and 204.

FIG. 2B shows an example diagram 206 of a light cone 218 incident on a DMD and light cones 212, 214, 216 reflected from a DMD 102 using a relatively wide aperture (lower f-number). A view 208 is perpendicular to main axes 222, 224, 226, 228 of the light cones 212, 214, 216, 218, so that the light cones 212, 214, 216, 218 travel parallel to the paper (parallel to the plane of the view 208). Accordingly, the view 208 is side-on to the light cones 212, 214, 216, 218. A view 210 is parallel to main axes 222, 224, 226, 228 of the light cones 212, 214, 216, 218, so that the illumination light cone 218 travels into the paper (into the plane of the view 210), and the other light cones 212, 214, 216 travel out of the paper (outward from the plane of the view 210). (View 210 is in angular space; accordingly, the light cones 212, 214, 216, 218 are shown in FIG. 2B as if parallel to each other at the projection aperture stop 126, which is described below with respect to FIG. 7A.) Accordingly, the view 210 looks down the centers of the light cones 212, 214, 216, 218. Both views 208, 210 show relative angles of the light cones 212, 214, 216, 218 (which typically will differ from actual positioning of light cones 212, 214, 216, 218 within the DLP color projector 100). The curved line 230 in view 202 corresponds to the line 232 in view 204, and is included to assist in visualizing the correspondence between views 208 and 210.

As shown in FIG. 2A, light incident on or reflected from the DMD 102 will generally comprise one of four light cones 212, 214, 216, 218. Light generated by the light emitters 104, 106, 108 corresponds to the illumination light cone 218. Interaction between DMD 102 micromirrors and related surfaces to produce the light cones 212, 214, 216 from the illumination light cone 218 is illustrated, and described below with respect to, FIG. 3.

An off-state light cone 212 has an off-state light cone main axis 222, and includes light reflected by DMD 102 micromirrors in the off-state 212'. A flat-state light cone 214 has a flat-state light cone main axis 224, and includes light reflected from DMD 102 surfaces other than micromirrors (flat-state surfaces 214'), such as a substrate on which the DMD 102 is built. For example, a DMD 102 micromirror array is typically built on a silicon crystal wafer, which is inherently reflective. Generally, a light cone illuminating the micromirror array (illumination light cone 218) is configured to be larger than the micromirror array at a plane of incidence, to avoid cutting off (not illuminating) a portion of the micromirror array surface. This results in some illumination ("overfill") being incident on, and therefore reflected from, the wafer surface. The wafer surface is typically coated with a low albedo material (such as a black, light-absorptive material) to reduce the intensity of the flat-state light 214 reflected by DMD 102 flat-state surfaces 214', such as the wafer surface. An on-state light cone 216 has an on-state light cone main axis 226, and includes light reflected from DMD 102 micromirrors in the on-state 216'. The width of the on-state light cone 216 output by the projector lens system 122 using a relatively high f-number (narrow aperture) is shown, in FIG. 2A, by a projection lens collection cone 220 (shown in both views 202, 204). An illumination light cone 218 has an illumination light cone main axis 228, and includes light from the light emitters 104, 106, 108, which can generally be considered white light (ignoring the time-wise separation of light, which is generally not perceptible to the human eye). The illumination light cone 218 is incident on and reflected by the DMD 102 to generate reflected light cones 212, 214, 216.

When the f-number is high enough (the aperture is narrow enough), as shown in views 202 and 204 of FIG. 2A, the light cones 212, 214, 216 reflected from the DMD 102 will generally not intersect (overlap). If the reflected light cones 212, 214, 216 do not overlap, the on-state light 216 will be shaped, focused, and emitted by the projector lens system 122, while the off-state light 212 and flat-state light 214 will be captured within an interior of the DLP color projector 100. Typically, off-state light 212 and flat-state light 214 will be incident on a housing (not shown) which encloses the DLP color projector, and converted to heat energy.

The width of the on-state light cone 216 received by the projector lens system 122 using a relatively low f-number (wide aperture) is shown in FIG. 2B by the projection lens collection cone 220 (shown in both views 208, 210). As shown in FIG. 2B, as the f-number decreases, the diameter of the aperture increases, and the light cones 212, 214, 216, 218 incident on and reflected from the DMD 102 grow wider (their cone angles increase). This is shown by, for example, the difference between the width of the projection lens collection cone 220 in FIG. 2A and the width of the projection lens collection cone 220 in FIG. 2B. This difference corresponds to the on-state light cone 216 being brighter in FIG. 2B due to increased light contribution from the illumination light cone 218. However, if the reflected light cones 212, 214, 216 are wide enough, flat-state light 214 can mix with on-state light 216. This is shown in both views 208, 210 of FIG. 2B as the flat-state and on-state light cones 214, 216 overlapping each other—overlapping triangles in view 208, and overlapping circles (note outlines) in view 210. (Some portions of the light cones 212, 214, 216, 218 are hidden behind other portions of the light cones 212, 214, 216, 218. In the example shown in FIG. 2B, the micromirrors in the DMD 102 are flat ideal mirrors, resulting in the light cones being the same width.) In the examples shown in FIGS. 2B, 7B, and 8B, the illumination cone 218 is "cut" (partially blocked) by the prisms 118, 120 (note that the outline of the illumination cone 218 is not fully circular), resulting in a "trimmed circle" shape. Light cones 212, 214, 216 produced by interaction of the illumination light cone 218 with the DMD 102 are also trimmed circles, but with mirrored orientation with respect to the illumination light cone 218.

An additional contribution of white light from the illumination cone 218 can be desirable to make the picture projected by the DLP color projector 100 brighter. However, as the diameter of the illumination light cone grows 218, increasing the diameter of the on-state light cone 216, the diameter of the flat-state light cone 214 also increases. When the on-state light cone 216 and the flat-state light cone 214 have sufficiently large diameters, they can overlap. This can result in flat-state light 214 being received by the projector lens system 122 and outputted by the DLP color projector 100, despite flat-state light 214 being intended to be captured within the DLP color projector 100 and not outputted.

Within the visible light spectrum, the human eye is generally most sensitive to green light, less sensitive to red light, and least sensitive to blue light. Generally, in DMDs 102, the coated wafer most strongly reflects (rather than absorbs) red light, less so blue light, and is least reflective with respect to green light. As a result, the light outputted by a DLP color projector 100 using a relatively small f-number (large light cone diameter) can have an unintended colored border (typically purple-tinted), which is generally most visible in dim background lighting conditions.

FIG. 3 shows an example illustration 300 of an interaction between light rays within the illumination cone 218 and possible reflections as introduced by FIG. 2A, illustrated in FIG. 3 by the main axes 222, 224, 226, and 228 of the reflected light cones 212, 214, 216 introduced above. The illumination light cone 218 (axis 228) reflects from off-state micromirrors 212' in the DMD 102 to produce the off-state light cone 212 (axis 222). The illumination light cone 218 reflects from a coated silicon wafer surface 214' to produce the flat-state light cone 214 (axis 224). The illumination light cone 218 reflects from on-state micromirrors 216' in the DMD 102 (tilted in a different direction from the off-state micromirrors 212') to produce the on-state light cone 216 (axis 226).

FIG. 4 shows an example view 400 of the on-state light cone 216 and the flat-state light cone 214 using a relatively low f-number (wide aperture). The overlap region 402, where the two light cones 214, 216 overlap, corresponds to the portion of the light in the flat-state light cone 214 which can go through the projection lens system 122 and cause a colored border around the projected image (the projected on-state light cone 216). The overlap region 402 is smaller than an overlap between two full circles would be because the illumination light cone 218 is "cut" by the prisms 218, 220. Cut regions 404, 406 correspond to light not present in the flat-state light cone 214 and the on-state light cone 216 (respectively) because of the light cut from the illumination light cone 218 by the prisms 218, 220.

FIG. 5A shows an example graph 500 of reflectance (as a percentage) against a wavelength of incident light (in nanometers) for a low-albedo-coated wafer on which a very small pixel (VSP) DMD is mounted, for various angles of incidence (AOI). As shown, more blue light (approximately 450-490 nm) is reflected than green light (approximately 520-560 nm), and more red light (approximately 635-700 nm) is reflected than blue light.

FIG. 5B shows an example graph 502 of reflectance (as a percentage) against a wavelength of incident light (in nanometers) for a low-albedo-coated wafer on which a tilt and roll pixel (TRP) DMD is mounted, for various angles of incidence (AOI). As shown, blue and green light reflectance remains relatively low at relatively high angles of incidence is reflected than green light, with more red light being reflected.

FIG. 6A shows an example of a graph 600 of color against brightness for a projected black image in light projected by a DLP color projector 100. Different lines show sampling results at different locations within the projected black image.

FIG. 6B shows a CIE 1931 color space chromaticity diagram 602 corresponding to the projected black image analyzed in FIG. 6A. The data points 604 at the center of the color chart 602 in FIG. 6B correspond to measurements of the color of the projected black image. The line 606 in the color chart 602 is included for purposes of comparison among FIGS. 6B, 6D, and 9C.

FIG. 6C shows a graph 608 of color against brightness for a projected purple border surrounding the projected black image analyzed in FIGS. 6A and 6B. Different lines show different sampling results at different locations within the border area of the projected black image. The projected purple border is caused by overlapping of the flat-state light cone 214 with the on-state light cone 216. As shown in FIG. 6C, blue and red wavelengths have a much higher relative amplitude with respect to green wavelengths in the projected purple border than in the projected black image analyzed in FIG. 6A.

FIG. 6D shows a CIE 1931 color space chromaticity diagram 610 corresponding to the projected purple border analyzed in FIG. 6C. The dots 612 offset from the center of the color chat 608 in FIG. 6D correspond to measurements of the color of the projected purple border. Note that the purple-indicating dots 612 shown in FIG. 6D (corresponding to the unintended colored border) are on a different side of the line 606 from the black-indicating dots 604 shown in FIG. 6B (corresponding to the intended projected image).

SUMMARY

In described examples, a digital light processing color projector includes light emitters configured to collectively emit light at multiple wavelengths, multiple light directing elements forming an illumination path having at least one aperture stop, a micromirror array coupled to a substrate, an aperture located at the aperture stop, and a filter with a selected color transmittance profile located at or near the aperture stop. The light directing elements are configured to direct light towards the micromirror array as illumination light. An aperture width determines a diameter of the illumination light. A micromirror on-state reflects the illumination light as on-state light. The substrate reflects the illumination light as flat-state light. The light directing elements direct on-state light through the aperture to a projector output. The filter filters flat-state light in an overlap region of the on-state light and flat-state light, or an illumination light portion corresponding to overlap region.

BRIEF DESCRIPTION OF THE DRAWINGS

FIG. 6B shows a CIE 1931 color space chromaticity diagram corresponding to the projected black image analyzed in FIG. 6A.

FIG. 9B shows a graph of color against brightness for the border and image projected as shown in and described with respect to FIG. 9A, using the color filter transmittance profile 906 shown in FIG. 9A.

FIG. 9C shows a CIE 1931 color space chromaticity diagram corresponding to the border and image projected as shown in and described with respect to FIG. 9A, using the color filter transmittance profile shown in FIG. 9A.

FIG. 10 shows an example table correlating transmittance values to wavelength bands for a color filter with a transmittance profile as shown in FIG. 9A.

FIG. 11 shows an example process for projecting an image using a DLP color projector.

DETAILED DESCRIPTION

Figure 1:
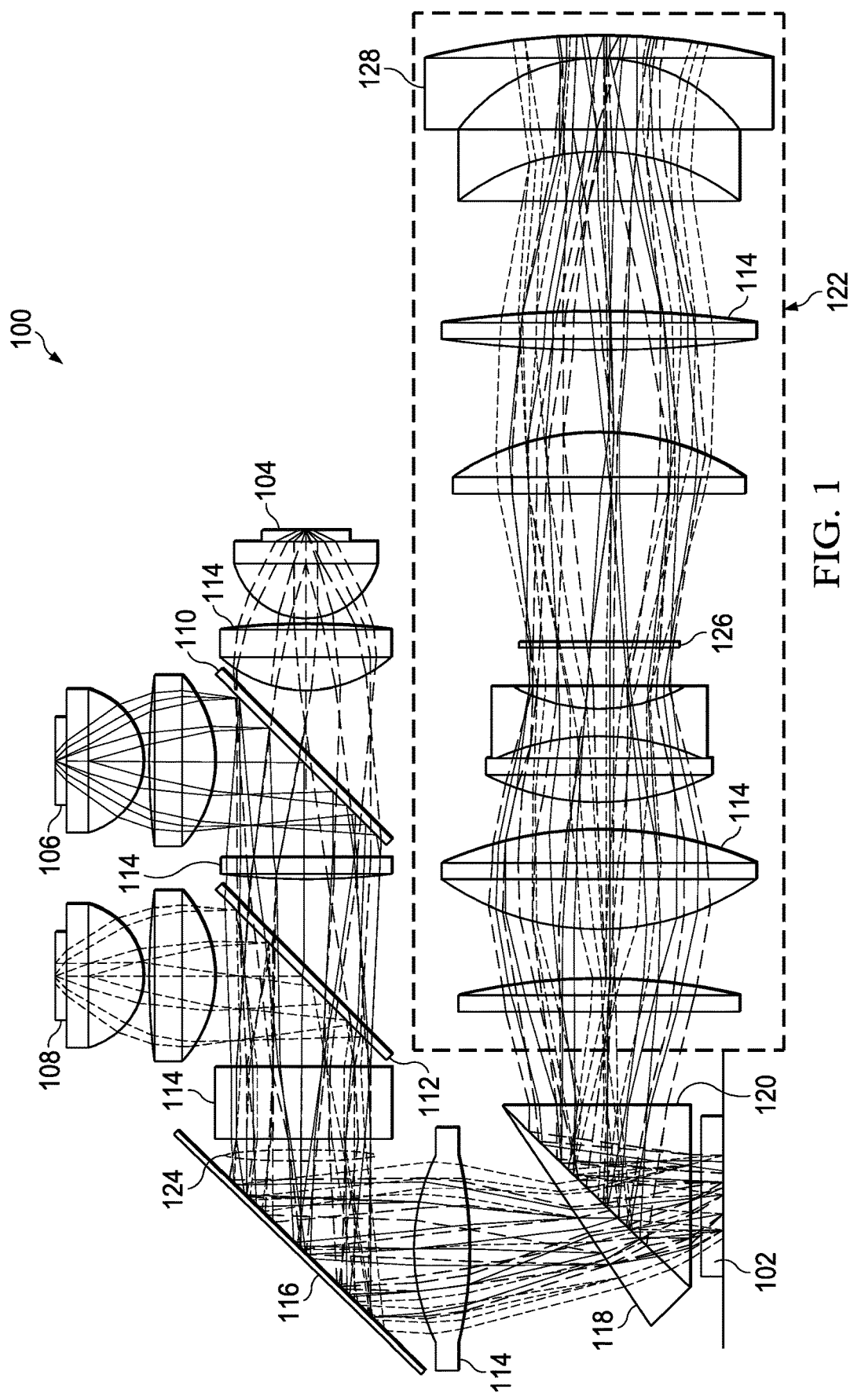
FIG. 1 shows an example layout for a DLP color projector, along with example paths taken by light sourced within and emitted from the DLP color projector.
Figure 7C:
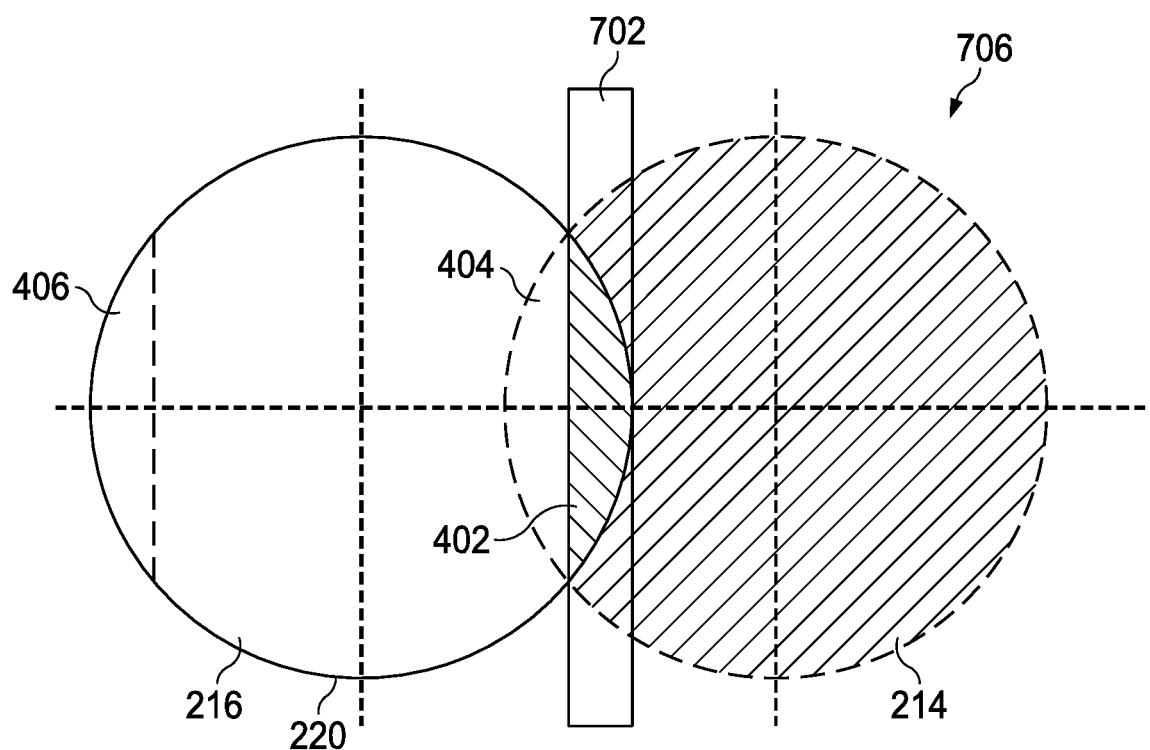
FIG. 7C shows an example view of a color filter with respect to an on-state light cone and a flat-state light cone.
Figure 5A:
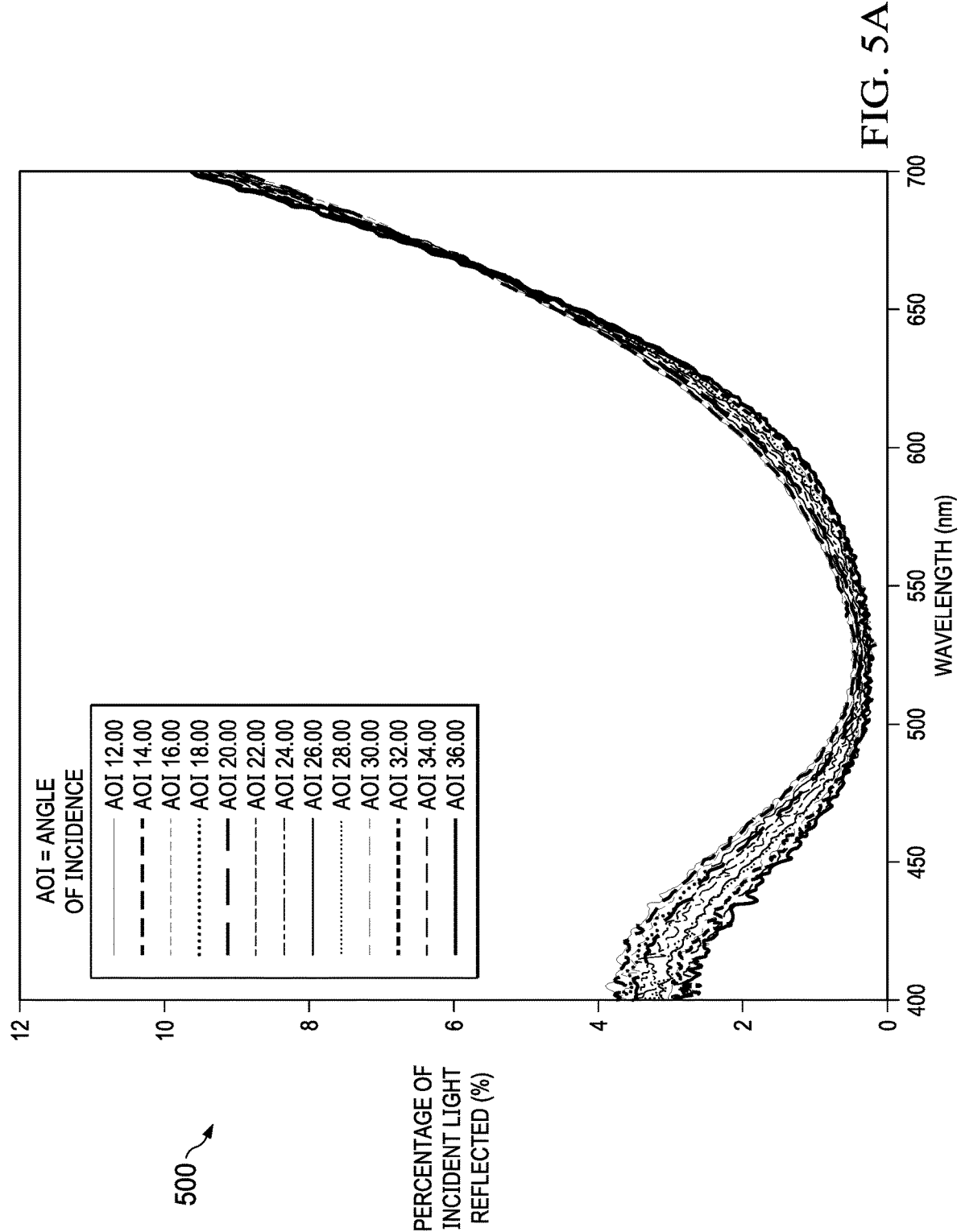
FIG. 5A shows an example graph of reflectance (as a percentage) against a wavelength of incident light (in nanometers) for a low-albedo-coated wafer on which a very small pixel (VSP) DMD is mounted, for various angles of incidence (AOI).
Figure 5B:
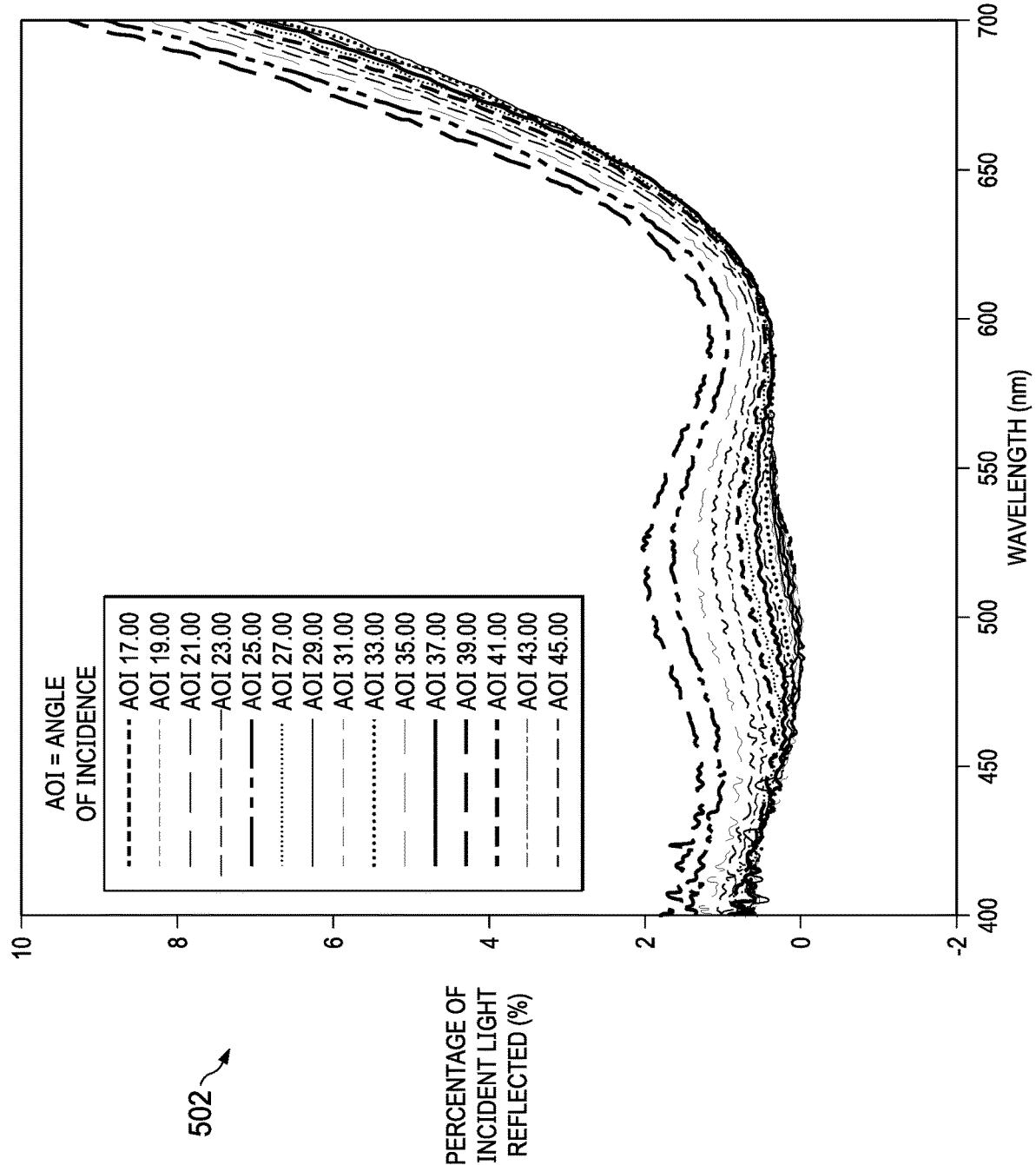
FIG. 5B shows an example graph of reflectance (as a percentage) against a wavelength of incident light (in nanometers) for a low-albedo-coated wafer on which a tilt and roll pixel (TRP) DMD is mounted, for various angles of incidence (AOI).
Figure 7A:
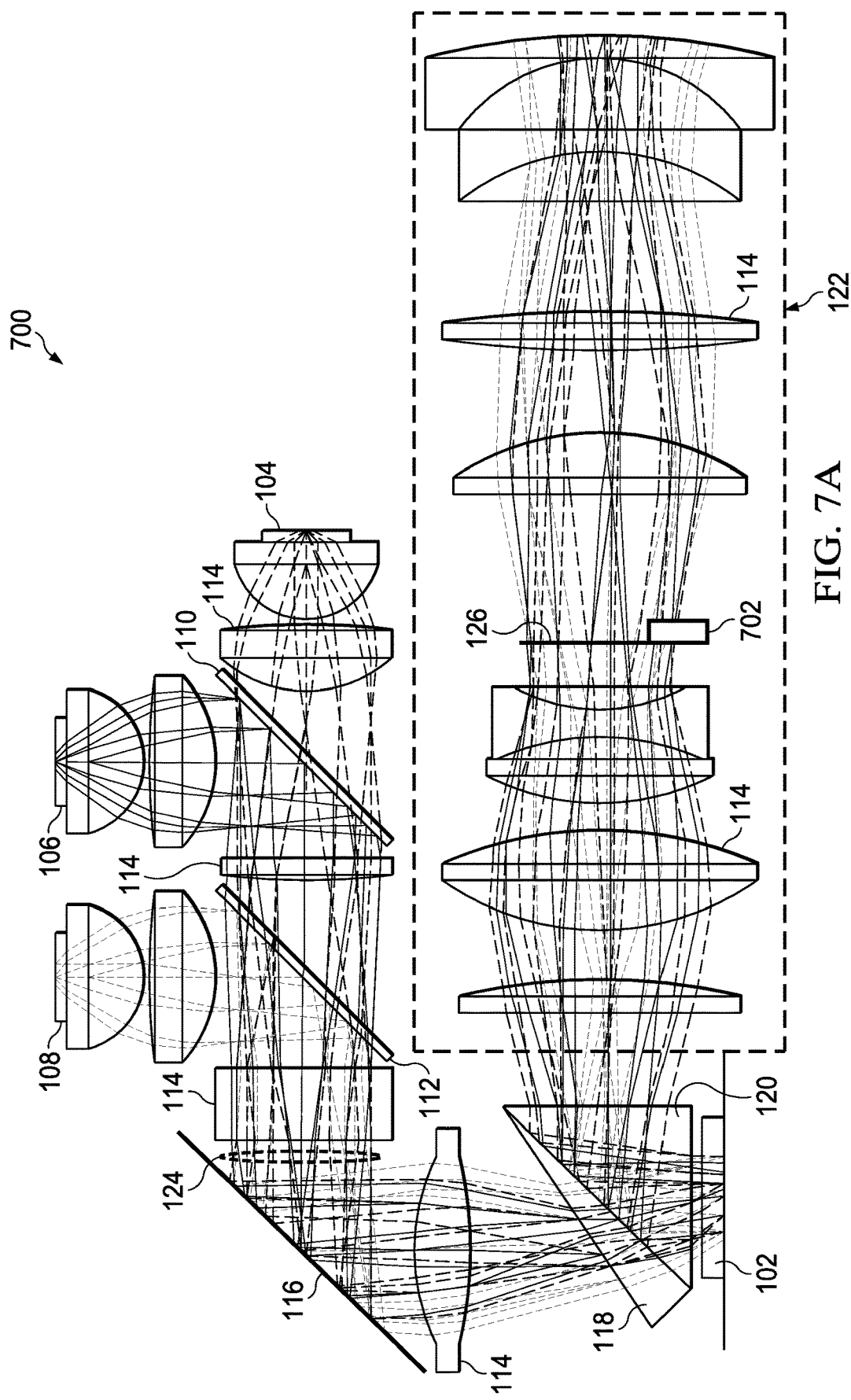
FIG. 7A shows an example layout for a DLP color projector, along with example paths taken by light sourced within and emitted from the DLP color projector.

FIG. 7A shows an example layout for a DLP color projector 700, along with example paths taken by light sourced within and emitted from the DLP color projector 700. The DLP color projector 700 of FIG. 7A shares various aspects with the DLP color projector 100 of FIG. 1A, so like reference numbers from FIG. 1A are carried forward to FIG. 7A for such items. The DLP color projector 700 of FIG. 7A includes a color filter 702 (in the example shown in FIG. 7A, a rectangular color filter 702) at a projection aperture stop 126 of the DLP color projector 100 (the projection aperture stop 126 is further described below).

Advantageously, a flat-state light cone 214 is filtered at the overlap region 402 (to reduce or eliminate the color border effect by filtering flat-state light) while minimally filtering the on-state light cone 216 (filtering on-state light reduces brightness of the intended image). The projection "aperture stop" 126, as used herein, is where light cones terminating at the micromirrors (pixels) of the DMD 102, and comprising the on-state light cone 216, maximally overlap each other (though generally not perfectly, due to imperfections of real optics). Similarly, the illumination "aperture stop" 124, as used herein, is where light cones terminating at the micromirrors of the DMD 102, and comprising the illumination light cone 218, maximally overlap each other. An aperture at an aperture stop 124, 126 can be used to selectably, simultaneously, and uniformly (generally approximately, due to imperfections of real optics) restrict an amount of light from each of the pixels of the respective light cone 216, 218 which passes the aperture stop 124, 126 and is projected by the color DLP projector 700. (Optical engineers sometimes call an aperture stop as described herein a "pupil".) The projection aperture stop 126 is also where the on-state light cone 216 and the flat-state light cone 214 have the least amount of spatial overlap. By contrast, for example, near the intersection of the illumination light cone 218 with the DMD 102, the spatial overlap between the on-state light cone 216 and the flat-state light cone 214 is generally close to 100%.

A light cone is comprised of a bundle of light rays. An aperture is an opening or structure in an optical system (such as the DLP color projector 700) which limits light ray bundles, preventing light rays which intersect material of the aperture from passing. The aperture in the illustrated example, located at the projection aperture stop 126, is located in the optical path and primarily determines the ray cone angle and brightness of an image projected from the DLP color projector 700. (The optical path is the path taken by light rays from the DMD 102 to a screen (not shown) on which the DLP color projector 700 projects light. A ray cone angle is a conical angle of the respective light cone.)

Figure 7B:
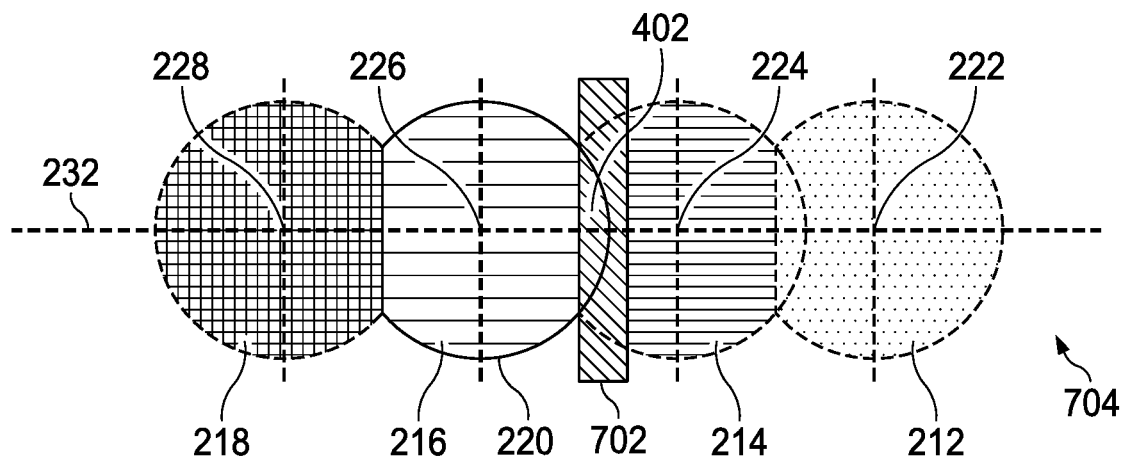
FIG. 7B shows an example plane view of the light cones at the projection aperture stop, the view being parallel to the main axes of the light cones.
Figure 8B:
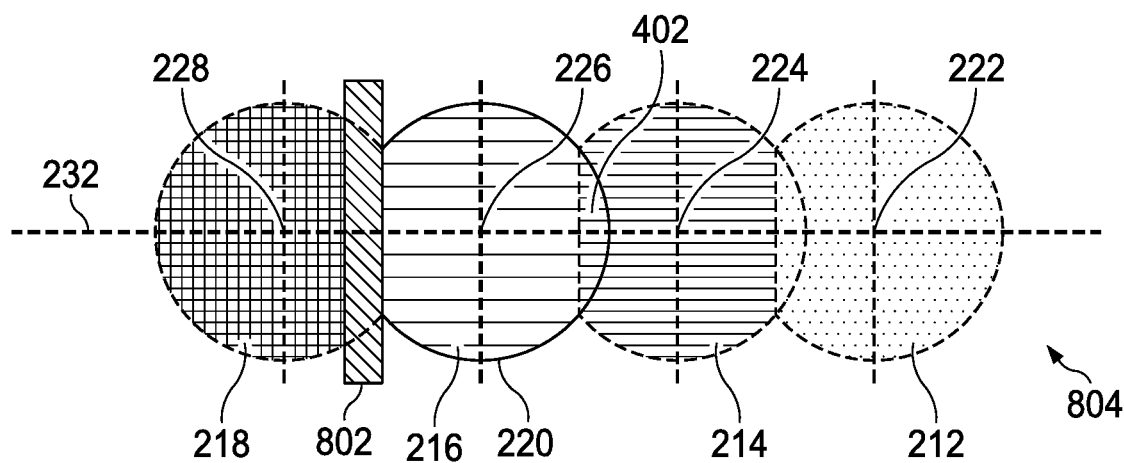
FIG. 8B shows an example plane view of the light cones at the projection aperture stop, the view being parallel to the main axes of the light cones.

At an aperture stop in the optical path (in the illustrated example, aperture stops 124, 126), light cones 212, 214, 216, 218 are generally distinct (as shown in FIGS. 7B and 8B). Accordingly, effecting changes to interactions between the on-state light cone 216 and the flat-state light cone 214 at an aperture stop in the optical path will generally result in similar changes to a corresponding portion of the on-state light output from the DLP color projector 700, 800. Accordingly, interactions (such as overlap) between light cones 212, 214, 216, 218 at the projection aperture stop 126 or the illumination aperture stop 124 correspond to interactions between contents of the light cones 212, 214, 216, 218 within the projected image. This means that filtering a particular portion of the color spectrum from the overlap region 402 (where the on-state light cone 216 and the flat-state light cone 214 overlap) will reduce the flat-state light cone's 214 contribution of that particular portion of the color spectrum to the projected image.

Figure 4:
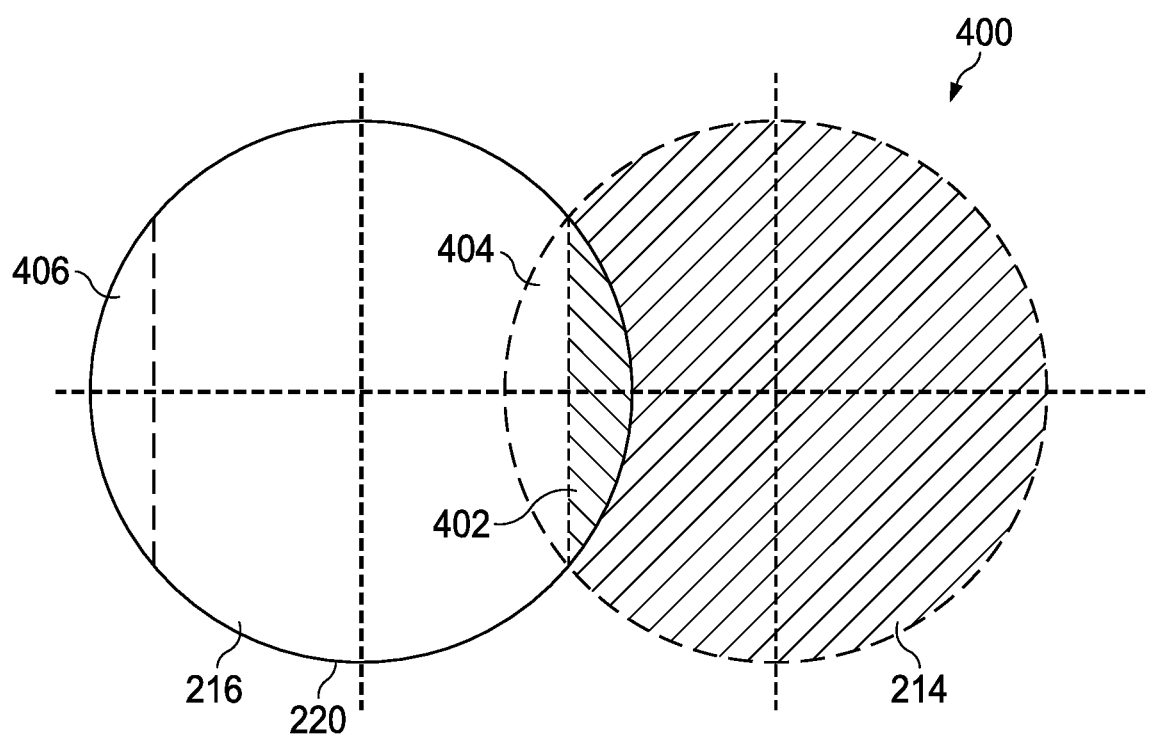
FIG. 4 shows an example view of the on-state light cone and the flat-state light cone using a relatively low f-number (wide aperture).

The color filter 702 preferably filters a particular portion of a selected color spectrum to diminish or remove visibility of the colored border which can result when a low f-number (wide aperture) is selected. The color filter 702 is preferably located, shaped, and sized so that at least a portion of the overlap region 402 (see, FIG. 4A), between the on-state light cone 216 and the flat-state light cone 214, passes through the color filter 702. The color filter 702 will generally diminish or remove the selected color spectrum from the light that reaches it, preferably including some of the light of the flat-state light cone 214 (and, generally, some of the light of the on-state light cone 216, since the goal is to filter a region of overlap 402 between the on-state light cone 216 and the flat-state light cone 214). Accordingly, the filtered selected color spectrum will not be displayed (projected) with the projected image in a region corresponding to the overlap 402 between the on-state light cone 216 and the flat-state light cone 214 (generally, the border of the projected image). Because the color filter can be significantly smaller than the on-state light cone 216 or the flat-state light cone 214, adverse color fidelity impact on the projected image can be limited, while reducing or eliminating an unintended colored border.

Figure 2A:
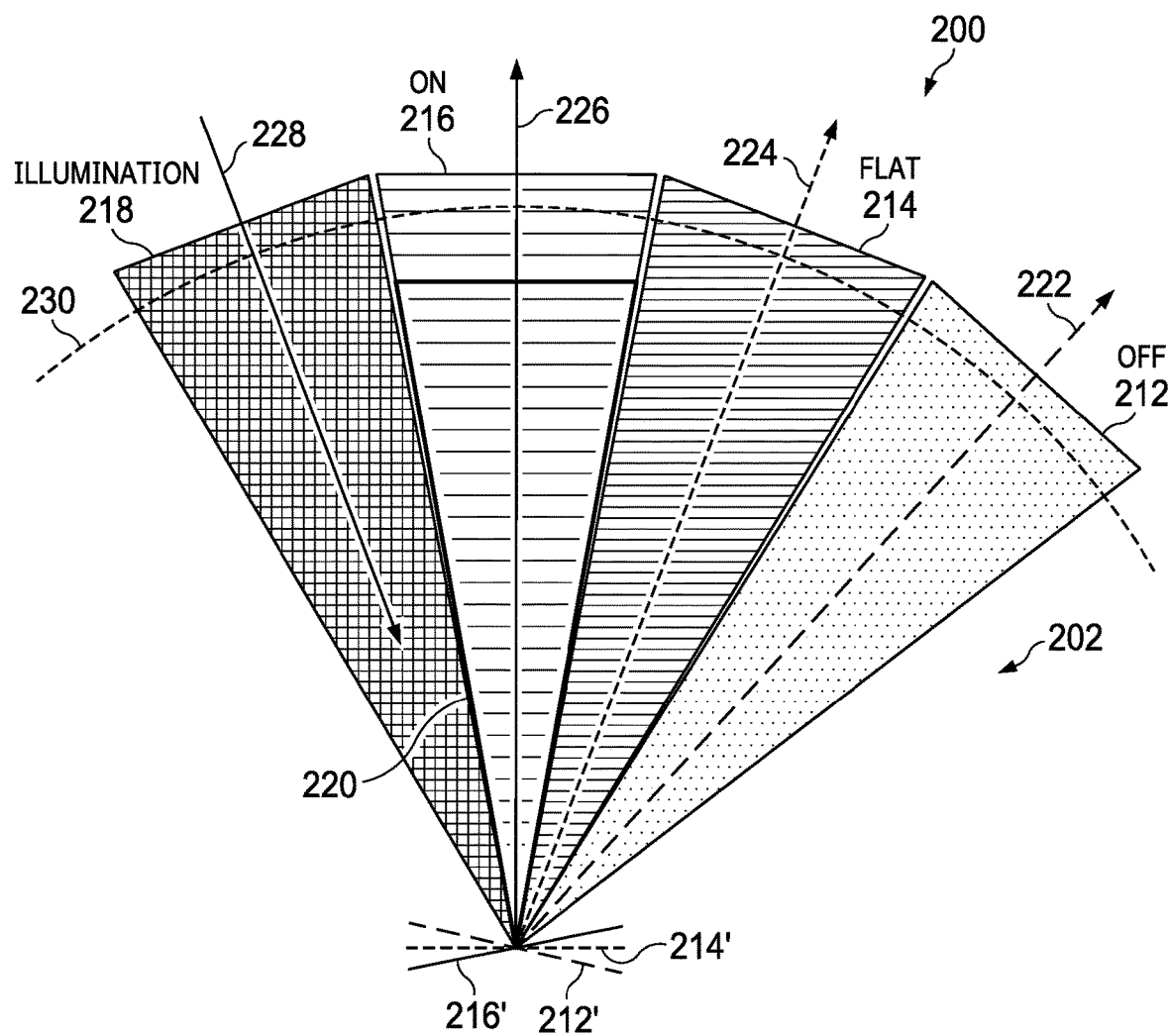
FIG. 2A shows an example diagram of a light cone incident on a DMD and light cones reflected from the DMD using a relatively narrow aperture (higher f-number).
Figure 2A:
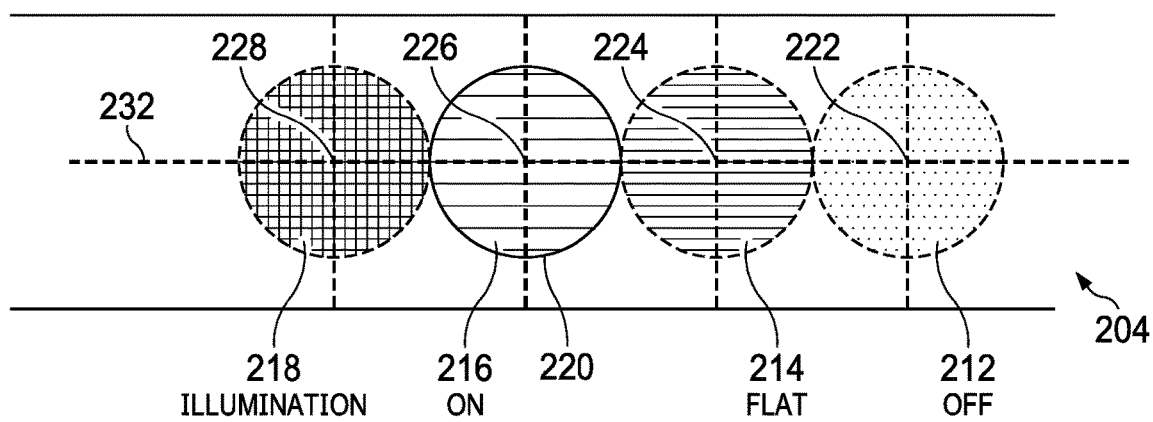
Figure 2B:
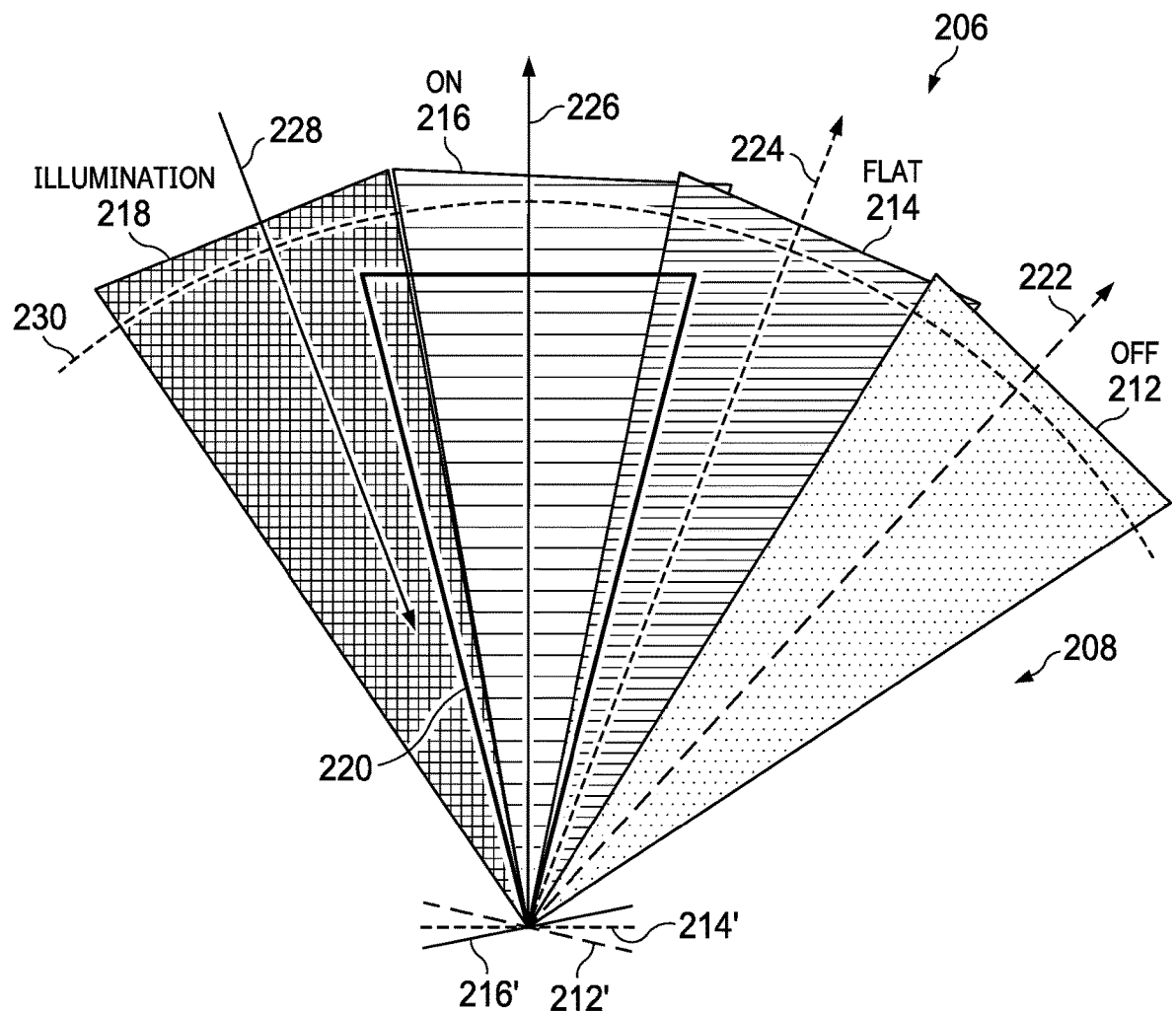
FIG. 2B shows an example diagram of a light cone incident on a DMD and light cones reflected from a DMD using a relatively wide aperture (lower f-number).
Figure 2B:
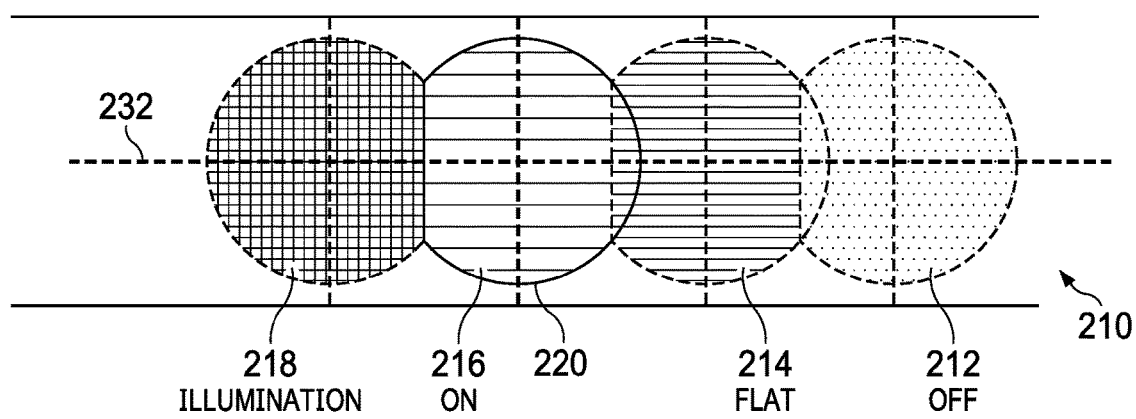
Figure 3:
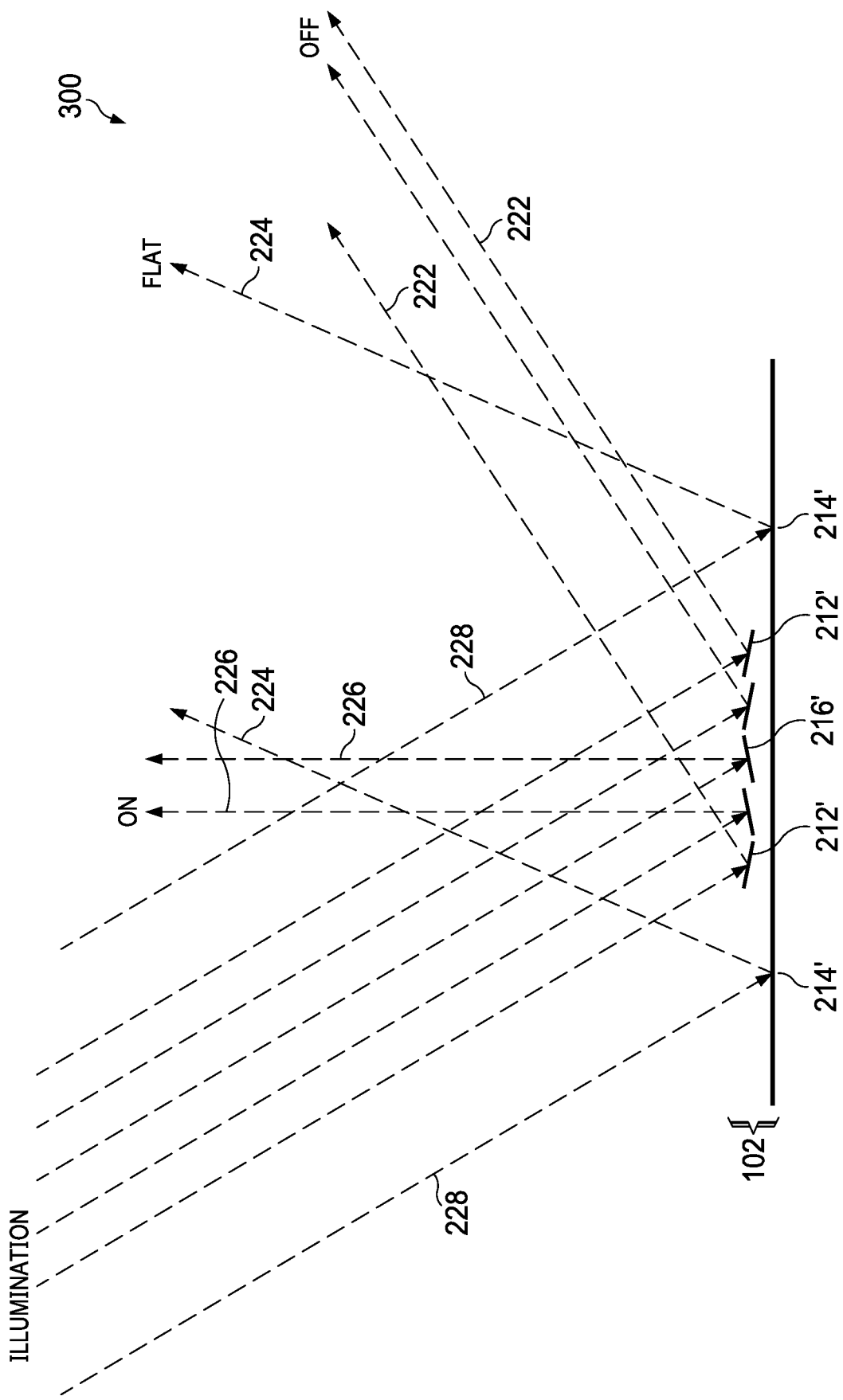
FIG. 3 shows an example illustration of an interaction between light rays within the illumination cone and possible reflections as introduced by FIG. 2A, illustrated in FIG. 3 by the main axes of the reflected light cones introduced above.
Figure 9A:
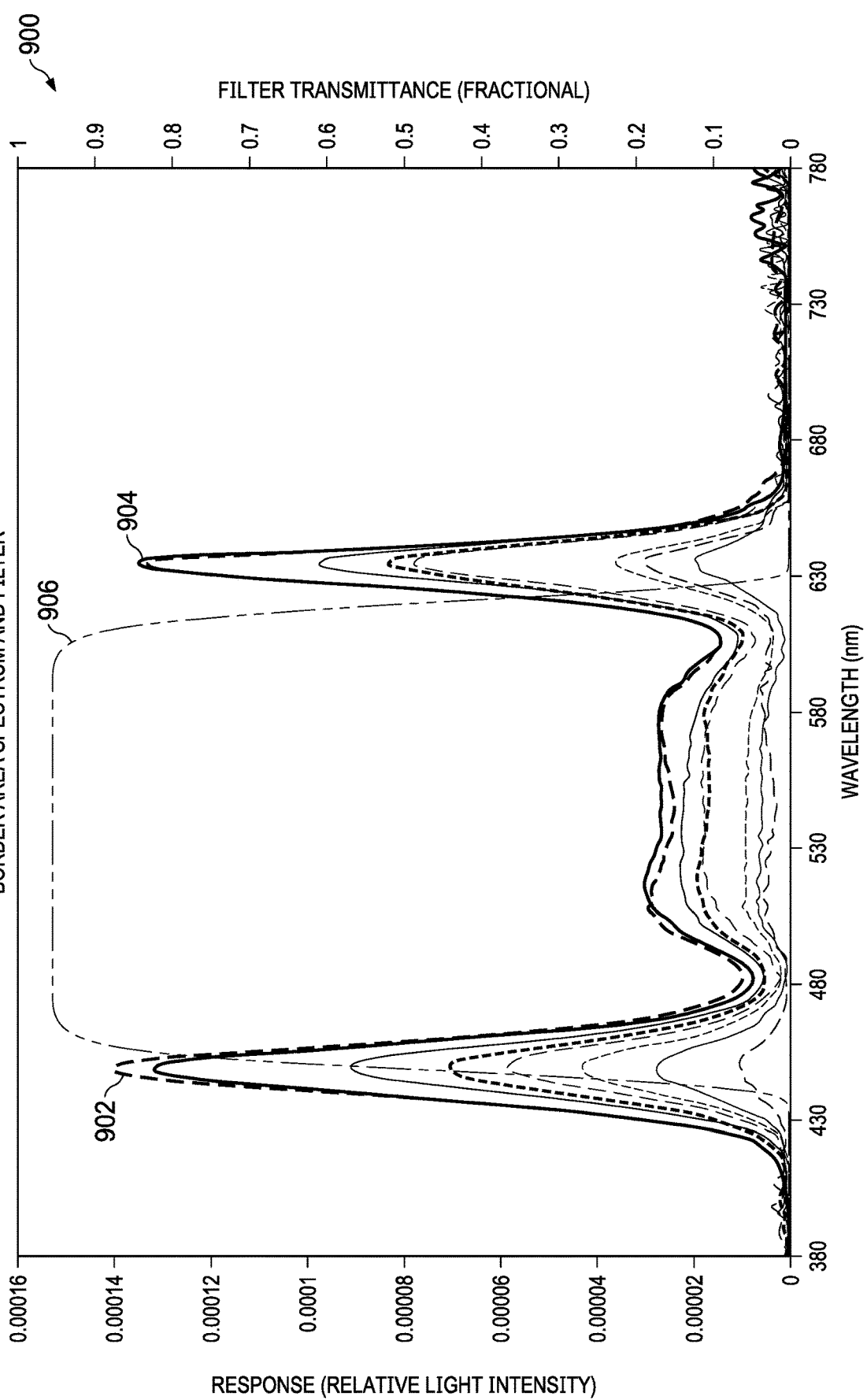
FIG. 9A shows a graph of color against brightness for a border surrounding a black image projected by a DLP color projector using a relatively low f-number (wide aperture).

Impact of the color filter 702 on color fidelity of the DLP color projector's 700 output is further described with respect to FIGS. 9A, 9B, and 9C. Preferably, the color filter 702 is located, shaped, and sized so that when there is maximum overlap between the on-state and flat-state light cones 214, 216, the amount of filtered on-state light cone 216 outside the overlap region 402 is minimized (as further described with respect to FIG. 7C). (Accordingly, when the aperture is set to its minimum f-number (widest aperture setting), the transverse area of the on-state light cone 216 which is not contained within the overlap region 402 and which is filtered is preferably small.) Note that in the example shown in FIG. 7A, a portion of the flat-state light cone 214 is truncated due to the illumination light cone 218 being "cut" by the prisms 118, 120 (as described with respect to FIG. 2B). As a result, the flat-state light cone's 214 cross-section is a "trimmed circle," and the size of the color filter 702 can be reduced, since the trimmed portion of the circle does not contribute to the overlap region 402.

FIG. 7B shows an example plane view 704 of the light cones 212, 214, 216, 218 at the projection aperture stop 126, the view 704 being parallel to the main axes 222, 224, 226, 228 of the light cones 212, 214, 216, 218. (View 704 is in angular space; accordingly, the light cones 212, 214, 216, 218 are shown in FIG. 7B as if parallel to each other at the projection aperture stop 126.) Accordingly, the view 704 looks down the centers of the light cones 212, 214, 216, 218. Accordingly the light cones 212, 214, 216 may be thought of as directional from the plane of the view 704, while light cone 218 as directional into the plane of the view 704. FIG. 7B shows relative angles of the light cones 212, 214, 216, 218 (which typically will differ from actual positioning of light cones 212, 214, 216, 218 within the DLP color projector 100). FIG. 7B shows how the color filter 702 is used to filter a portion of the light from the flat-state light cone 214 corresponding to the overlap region 402 (incidentally also filtering a portion of the light from the on-state light cone 216) from reaching the output of the DLP color projector 700.

FIG. 7C shows an example view 706 of a color filter 702 with respect to an on-state light cone 216 and a flat-state light cone 214. (FIG. 7C also applies to color filters 802 as described with respect to FIG. 8A). As shown in FIG. 7C, a color filter 702 is located to filter out light from the overlap 402 between the on-state light cone 216 and the flat-state light cone 214. The filter 702 is preferably configured to cover (some or all of) the overlap region 402 in normal operation of the DLP color projector 700. For example, the color filter 702 can be configured to filter the overlap region 402 and none of the on-state light cone 716 not within the overlap region 402 when the aperture diameter is at its largest setting (minimum f-number). Alternatively, the color filter 702 can be configured to filter an overlap region 402 sized to correspond to a different (non-minimum) selected f-number. (As will be apparent to one of ordinary skill in the art of DLP light projection, various other configurations with respect to, for example, shape and location of the color filter 702, aperture diameter, and amount of overlap region filtered 402, are possible.) This means that, depending on the size, shape and location of the filter 702, and the diameter of the aperture (in the illustrated example, at the projection aperture stop 126), some of the on-state light cone 216 may be filtered by the filter 702. Also, if the aperture diameter is variable, then when the aperture is not at its largest diameter (smallest f-number), additional portions of the on-state light cone 216 will be filtered by the filter 702.

Figure 7D:
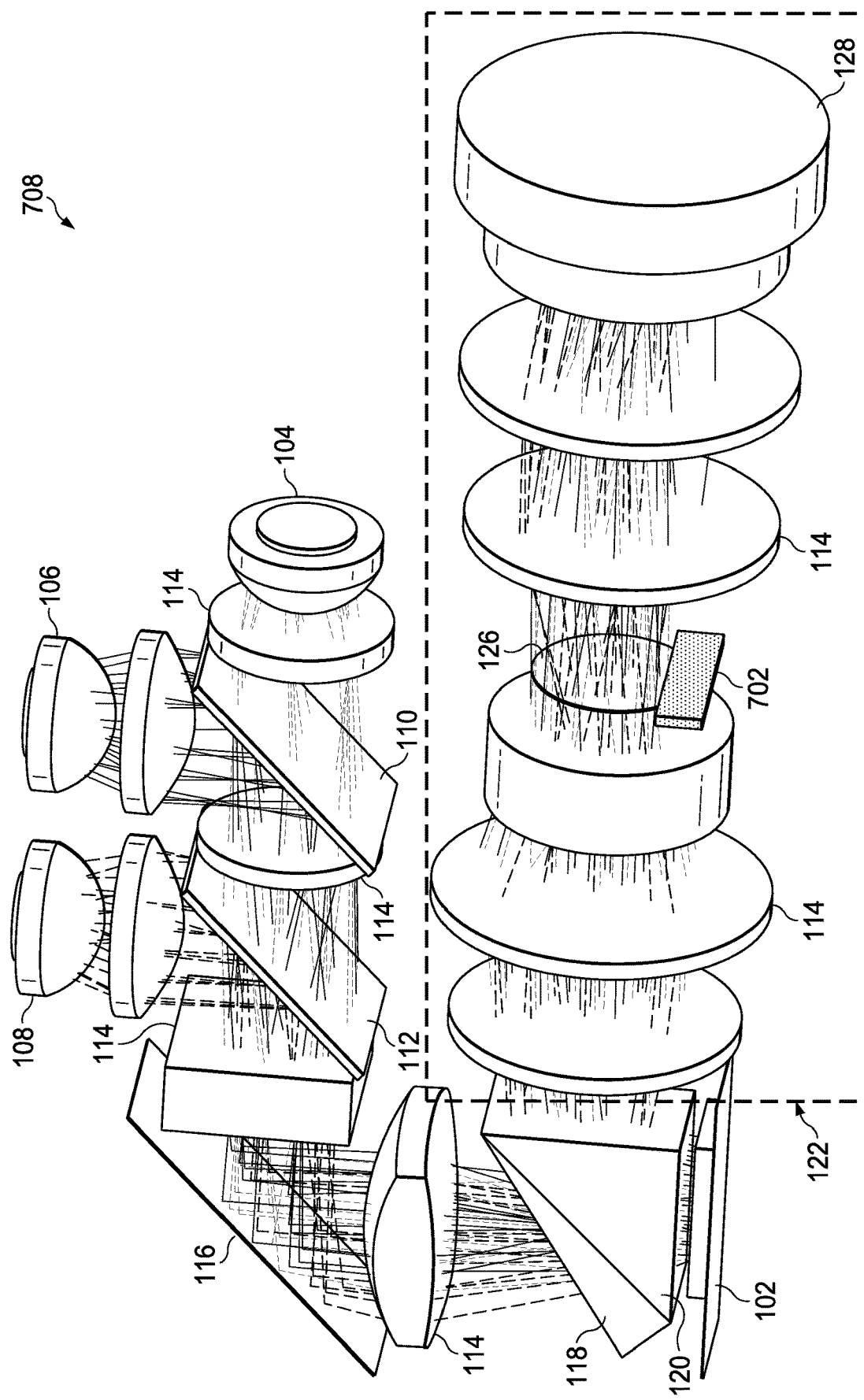
FIG. 7D shows an example rotated view of the example layout for a DLP color projector with example light paths of FIG. 7A.

FIG. 7D shows an example rotated view 708 of the example layout for a DLP color projector 700 with example light paths of FIG. 7A.

Figure 8A:
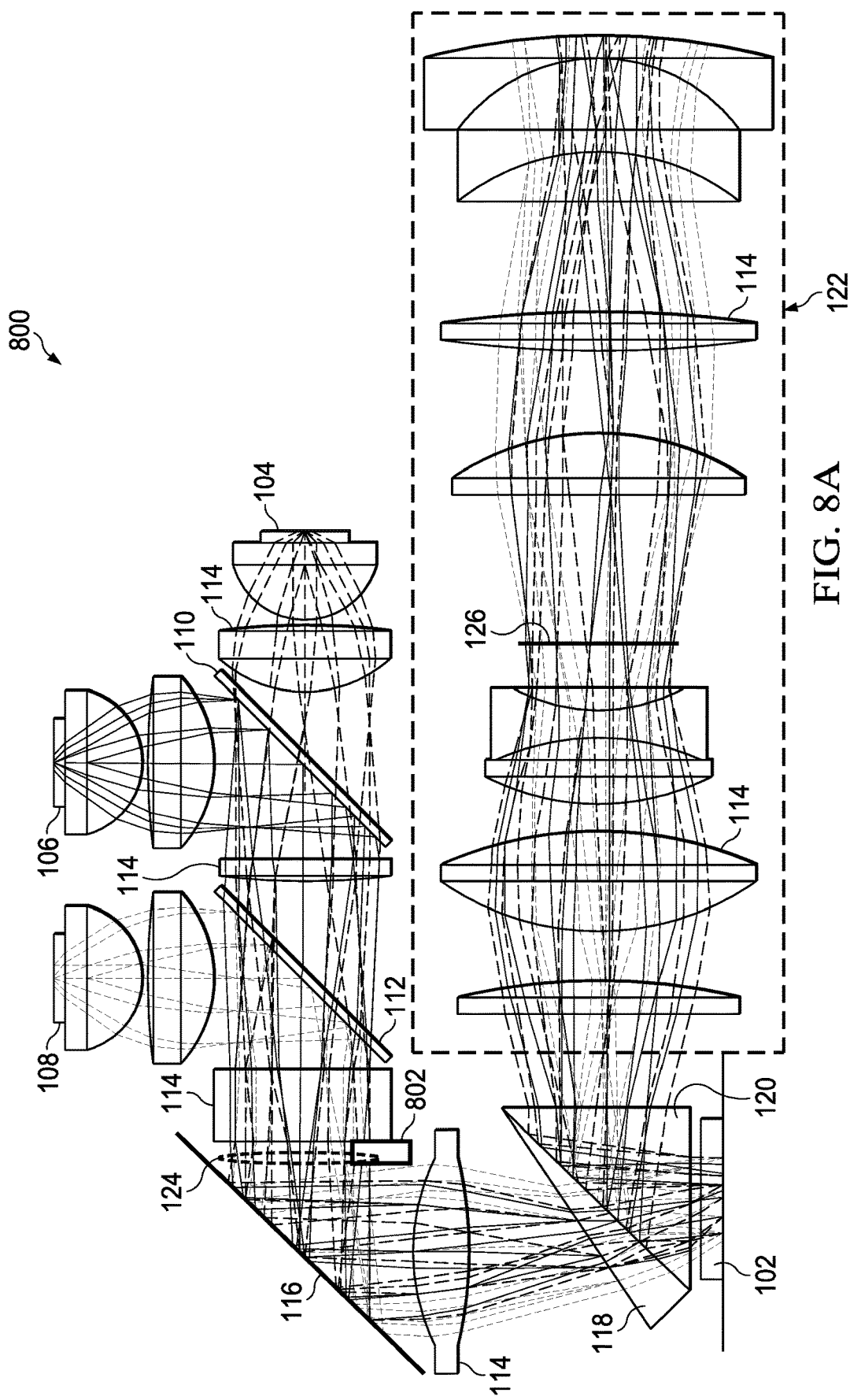
FIG. 8A shows an example layout for a DLP color projector, along with example paths taken by light sourced within and emitted from the DLP color projector.

FIG. 8A shows an example layout for a DLP color projector 800, along with example paths taken by light sourced within and emitted from the DLP color projector 800. The DLP color projector 800 of FIG. 8A shares various aspects with the DLP color projector 100 of FIG. 1A, so like reference numbers from FIG. 1A are carried forward to FIG. 8A for such items.

FIG. 8B shows an example plane view 804 of the light cones 212, 214, 216, 218 at the projection aperture stop 126, the view 804 being parallel to the main axes 222, 224, 226, 228 of the light cones 212, 214, 216, 218. (The light cones 212, 214, 216, 218 are shown in FIG. 8A as if parallel to each other at the projection aperture stop 126.) Accordingly, the view 704 looks down the centers of the light cones 212, 214, 216, 218. Similar to FIG. 7B, therefore, light cones 212, 214, 216 are directionally from the plane of the view 804 and light cone 218 is directionally into the plane of the view 804. FIG. 8B shows relative angles of the light cones 212, 214, 216, 218 (which typically will differ from actual positioning of light cones 212, 214, 216, 218 within the DLP color projector 100).

The DLP color projector 800 of FIG. 8A includes a color filter 802 at the illumination aperture stop 124 of the DLP color projector 800. Color filter 802 of FIG. 8A is used similarly to the color filter 702 of FIG. 7A, although in FIG. 8A color filter 802 filters the combined incident light before it is reflected by the DMD 102. Consequently, filtering portions of the incident illumination light cone 218 at the illumination aperture stop 124 has the result of an equivalent filtering in corresponding portions of each reflected light cone 212, 214, 216. As shown in FIG. 8B, the color filter 802 is used to filter a region of the illumination light cone 218 at the illumination aperture stop 124 which, when reflected by the DMD 102, will correspond to an overlap region 402 of the flat-state light cone 214 and the on-state light cone 216. The effects of filtering the illumination light cone 218 will appear in the reflected overlap of the flat-state light cone 214 and the off-state light cone 212. This results in the light which reaches the overlap region 402 already having been filtered by the color filter 802 at the illumination aperture stop 124. Similar considerations guide the location, shape and size of the color filter 802 of FIG. 8A as the color filter 702 of FIG. 7A. Because the color filter 802 can be significantly smaller than the portion of the illumination light cone 218 which is reflected by the DMD 102 to form the on-state light cone 216, adverse color fidelity impact on the projected image can be limited, while reducing or eliminating an unintended colored border. Impact of the color filter 802 on color fidelity of the DLP color projector's 800 output is further described with respect to FIGS. 9A, 9B, and 9C.

Figure 8C:
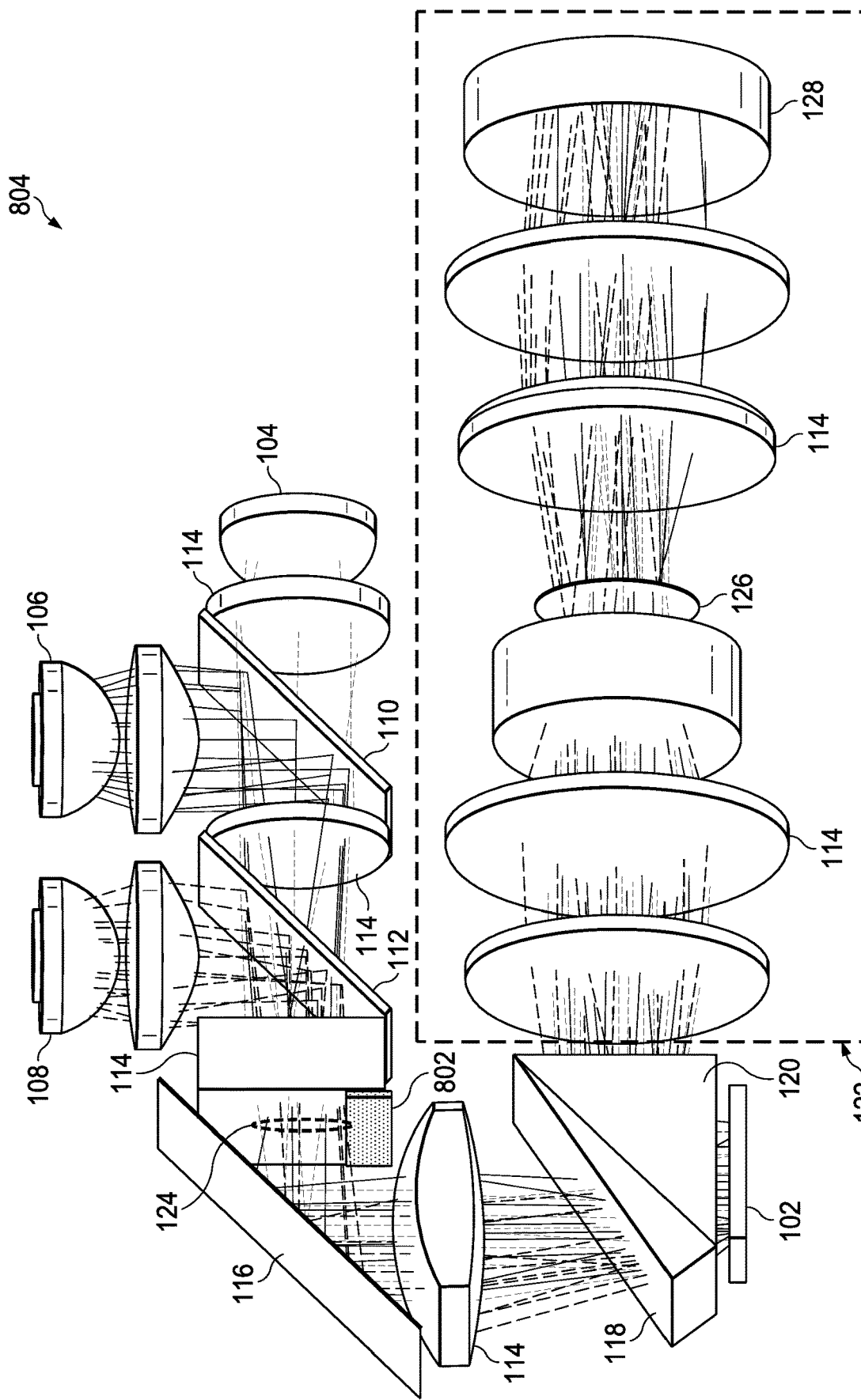
FIG. 8C shows an example rotated view of the example layout for a DLP color projector with example light paths of FIG. 8A.

FIG. 8C shows an example rotated view 804 of the example layout for a DLP color projector 800 with example light paths of FIG. 8A.

FIG. 9A shows a graph 900 of color against brightness for a border surrounding a black image projected by a DLP color projector 100 using a relatively low f-number (wide aperture). FIG. 9A shows energy peaks at blue 902 and red 904 portions of the spectrum. To compensate for this undesired flat-state light, a color filter 702 or 802 with a selected transmittance profile 906 can be used (in a DLP color projector 700 or 800, respectively), with transmittance values for specific wavelengths as shown (and further described with respect to the exemplary filter transmittance values provided in FIG. 10). Because, as described above, the human eye responds particularly weakly to blue light, a color filter 702 or 802 preferably is selected to filter transmission primarily of red light; filtering transmission of some wavelengths of blue light may also be appropriate (depending, for example, on the application). Because a flat-state light cone 214 will generally contain relatively small amounts of green light, the color filter 702 or 802 preferably allows nearly complete (or complete) transmission of green light. Color filter 702, 802 transmittances can be selected to, for example, mitigate undesired effects of the flat-state light cone 214 on the projected image while minimally impacting on-state light cone 216 (intended projected image) color fidelity.

FIG. 9B shows a graph 908 of color against brightness for the border and image projected as shown in and described with respect to FIG. 9A, using the color filter transmittance profile 906 shown in FIG. 9A. A color filter 802 located at the illumination aperture stop 124 was used to produce the example graph 908 shown in FIG. 9B; a color filter 702 located at the projection lens aperture stop 126 will generally produce similar or the same results. As shown in FIG. 9B, the color filter 702 or 802 has nearly eliminated the red light energy peak 904, and significantly reduced the magnitude of the blue light energy peak 902 (note the change in scale).

Figure 6A:
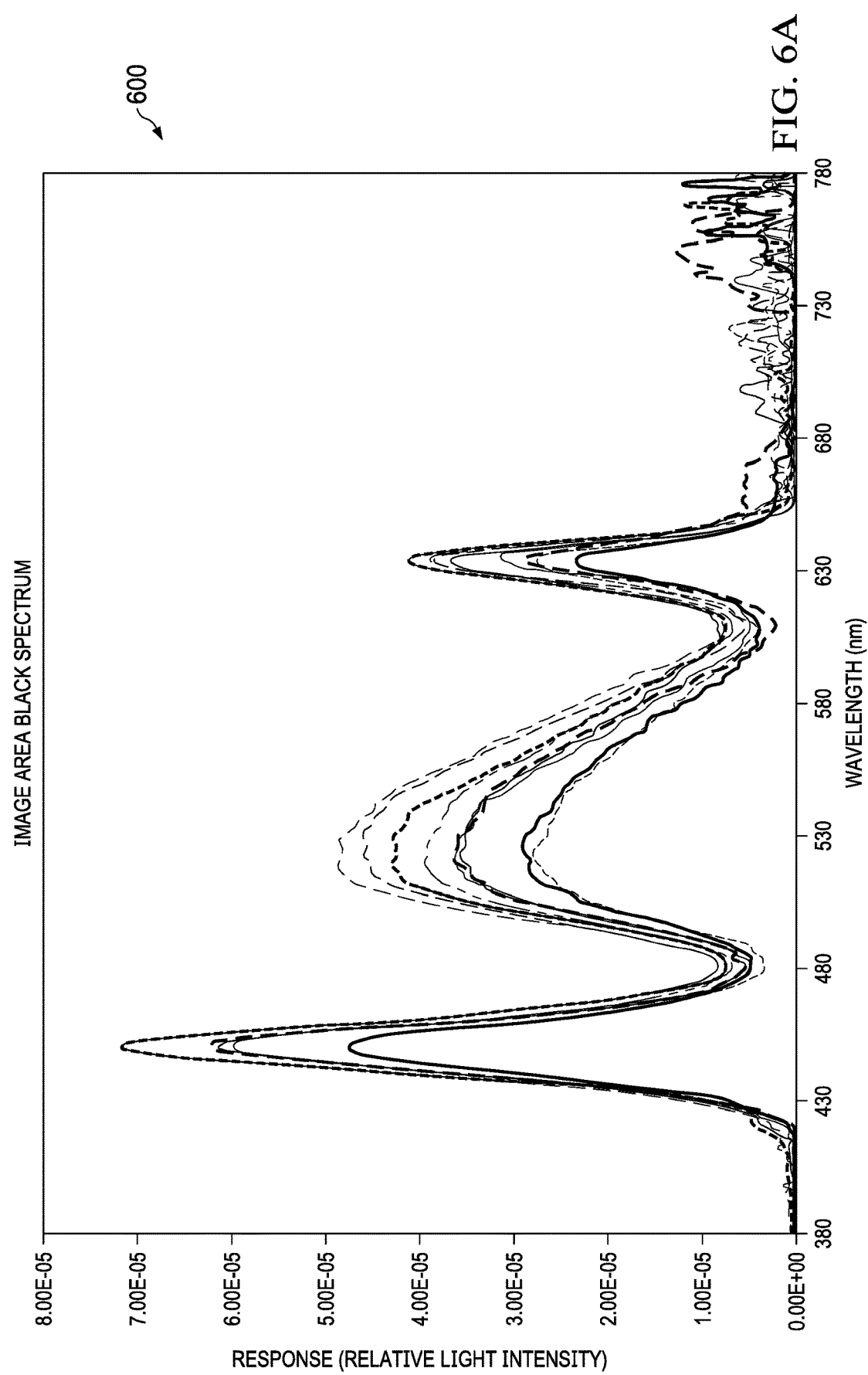
FIG. 6A shows an example of a graph of color against brightness for a projected black image in light projected by a DLP color projector.
Figure 6C:
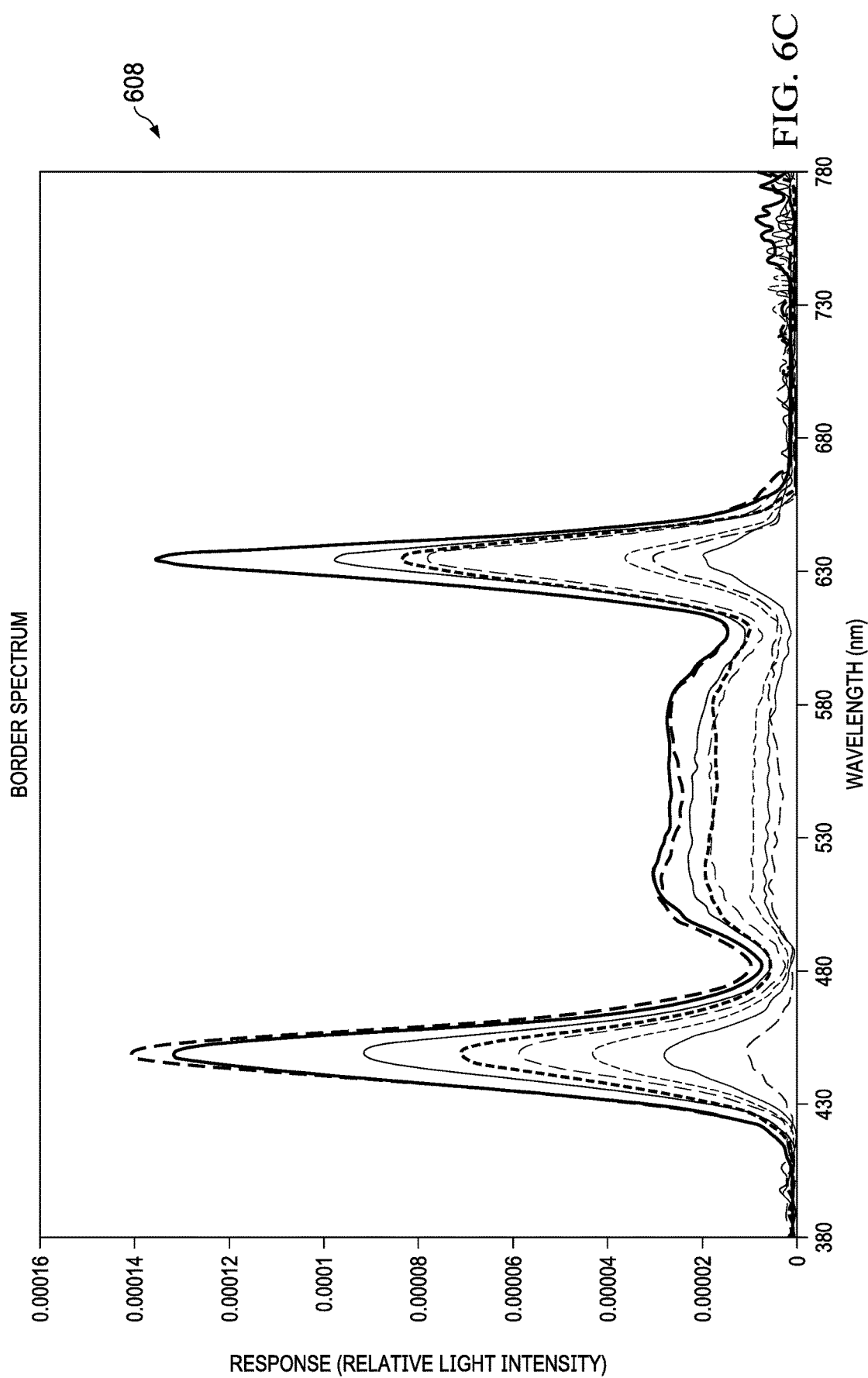
FIG. 6C shows a graph of color against brightness for a projected purple border surrounding the projected black image analyzed in FIGS. 6A and 6B.
Figure 6D:
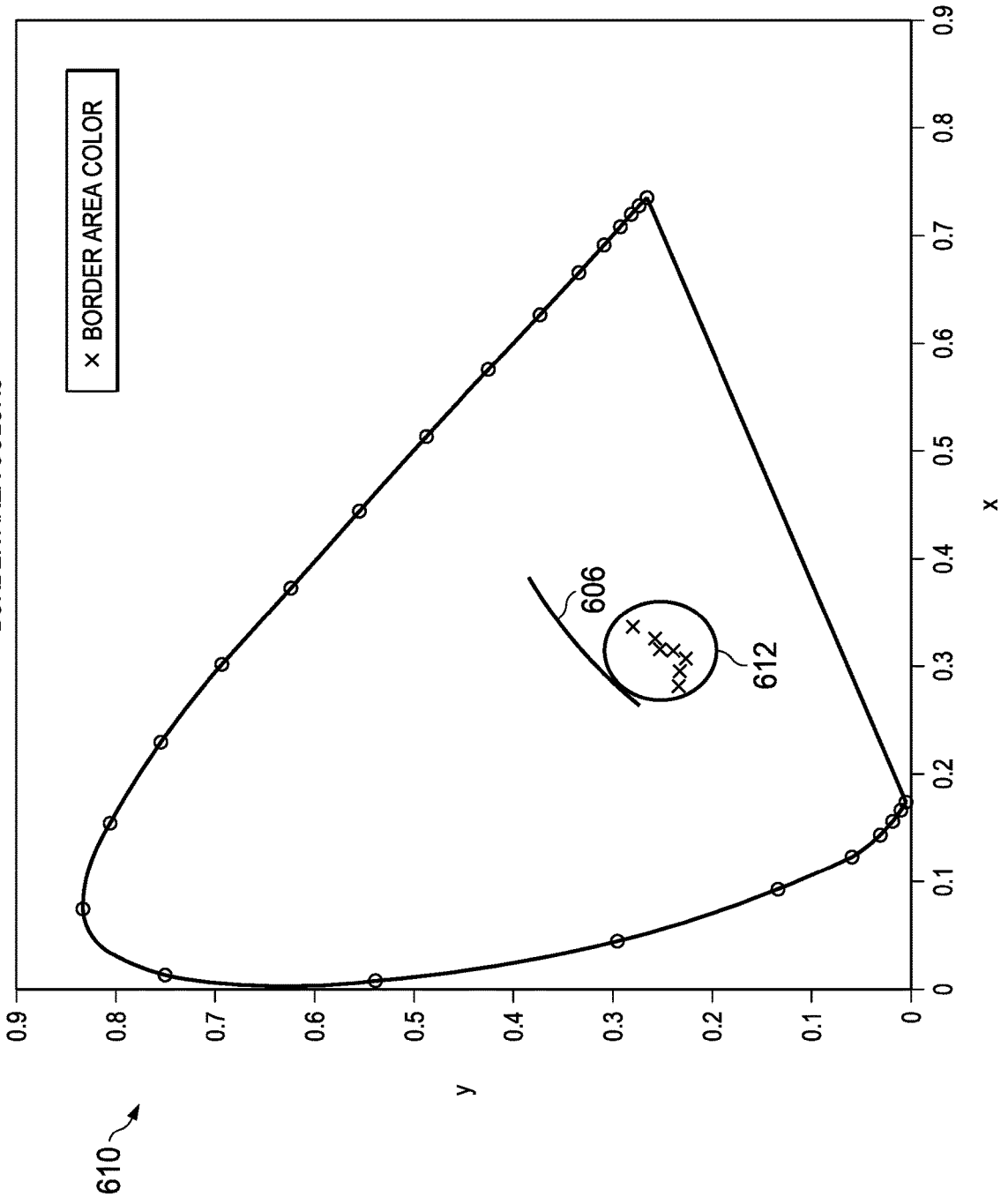
FIG. 6D shows a CIE 1931 color space chromaticity diagram corresponding to the projected purple border analyzed in FIG. 6C.

FIG. 9C shows a CIE 1931 color space chromaticity diagram 910 corresponding to the border and image projected as shown in and described with respect to FIG. 9A, using the color filter transmittance profile 906 shown in FIG. 9A. The data points 604 (dots) at the center of the color chart 910 in FIG. 9C correspond to measurements of the color of the projected black image. The line 606 in the color chart 910 is included for purposes of comparison among FIGS. 6B, 6D, and 9C. Without filtering using a color filter 702 or 802, color measurements of the border of the projected image result in data points 612 ("x"es) corresponding to a purple color. Filtering using the color filter transmittance profile 906 shown in FIG. 9A results in color measurements of the border of the projected image producing data points 912 (plusses) near to—closely approximating the color represented by—the data points 604 corresponding to the color of the projected black image. These results can be achieved using a color filter 702 to filter the overlap region 402 at the projection aperture stop 126, or using a color filter 802 to filter the illumination light cone 218 at the illumination aperture stop 124.

FIG. 10 shows an example table 1000 correlating transmittance values to wavelength bands for a color filter 702 or 802 with a transmittance profile 906 as shown in FIG. 9A.

FIG. 11 shows an example process 1100 for projecting an image using a DLP color projector. As shown in FIG. 11, in step 1102, illuminating light having multiple wavelengths is focused on a digital micromirror device (DMD). In step 1104, a portion of the illuminating light to project using the DMD is selected using on-state micromirrors of the DMD. In step 1106, a color filter with a selected color transmittance profile is used to filter light included within an overlap region. The overlap region is where (when the aperture diameter is wide enough—accordingly, the f-number is small enough) the on-state light cone (the selected portion of the illuminating light) and the flat-state light cone overlap each other. Filtering of the overlap region can occur at the illumination aperture stop (filtering light which will comprise the overlap region after the illumination light cone is reflected from the DMD), or at the projector aperture stop (directly filtering the overlap region). In step 1108, the on-state light, including the (at least partially filtered) overlap region, is projected using a projector lens.

Modifications are possible in the described embodiments, and other embodiments are possible, within the scope of the claims.

In some embodiments, color filters are different shapes and/or different sizes.

In some embodiments, color filters filter different portions of the color spectrum. In some embodiments, color filters have different transmittances at different portions of the color spectrum.

In some embodiments, one or more light emitters, collectively configured to emit multiple wavelengths, are used. In some embodiments, one or more of the light emitters has controllable brightness (amplitude) and/or output spectrum (frequencies).

In some embodiments, mirrors are used as light directing elements; in some embodiments, light directing elements are used other than mirrors.

In some embodiments, turning micromirrors in a DMD on or off to enable an on-state or off-state can correspond to switching the micromirrors between two different activation (or deactivation) states.

In some embodiments, the illumination light cone is not cut by the prisms.

In some embodiments, a different number of apertures in the optical path is used.

In some embodiments, apertures are differently located than as described above.

In some embodiments, the prisms are a single, unitary prism. In some embodiments, different configurations of emitters, lenses, mirrors, filters, and/or prisms are used.

In some embodiments, the filter can be located near, rather than overlapping, an aperture stop; however, this will generally result in an increased amount of filtered on state light and/or a decreased amount of filtered flat state light. This can be done, for example, to obtain mechanical clearance from other structures (such as a physical aperture). A color filter being "near" an aperture stop is defined herein to mean that the distance of the color filter from the aperture stop results in an amount of filtered on-state light and/or unfiltered flat-state light which is within design parameters.

In some embodiments, different aperture and/or aperture stop configurations are used.

What is claimed is:

1. A color projector, comprising:
   a digital micromirror device (DMD);
   a lens configured to output light from the color projector;
   one or more light emitters configured to collectively emit light at multiple wavelengths;
   multiple light directing elements forming an illumination path having at least one aperture stop, including a projector aperture stop between the DMD and the lens;
   a micromirror array fixedly coupled to a substrate, the light directing elements configured to direct light towards the micromirror array as an illumination light cone, micromirrors in the micromirror array having an on-state and an off-state, the on-state configured to reflect the illumination light cone as an output of the color projector as on-state light, the substrate configured to reflect at least a portion of the illumination light cone as flat-state light;
   an aperture located at the aperture stop, a diameter of the illumination light cone at least partially determined by a width of the aperture, the light directing elements configured to direct light through the aperture to an output of the color projector; and
   a filter at or near the projector aperture stop, the filter having a color transmittance profile, the filter configured to pass at least a portion of the illumination light cone or of the flat state light when a diameter of the aperture enables the on-state light and the flat-state light to overlap in an overlapping region, the passed portion corresponding to the overlapping region.

2. The color projector of claim 1, wherein the diameter of the aperture is selectable.

3. The color projector of claim 1, wherein the filter is located at or near an illumination aperture stop between the light emitters and the micromirror array.

4. The color projector of claim 3, wherein the filter is configured to pass an illumination portion of the illumination light cone, the illumination portion comprising flat-state light within the overlapping region after the illumination portion is reflected by the substrate.

5. The color projector of claim 1, wherein the filter is configured to filter a portion of the flat-state light within the overlapping region.

6. The color projector of claim 1, wherein the filter is located and sized not to filter a majority of the on-state light.

7. The color projector of claim 1, wherein the filter is configured to filter a smaller portion of the on-state light outside the overlapping region than of the on-state light within the overlapping region, if the aperture has a maximum diameter.

8. The color projector of claim 1, wherein the filter has a low transmittance in red wavelengths, and a higher transmittance in green and blue wavelengths.

9. The color projector of claim 1, wherein a size of the filter at least partially depends on a maximum diameter of the aperture.

10. The color projector of claim 1, wherein the transmittance profile enables the filter to filter different wavelengths of light with different transmittances.

11. A method of image projection, the method comprising:

focusing illuminating light having multiple wavelengths on a digital micromirror device (DMD);

selecting a portion of the illuminating light to project using the DMD;

filtering, using a color filter with a color transmittance profile, light included within an overlap region in which the portion and a flat-state light cone overlap each other, the flat-state light cone being illuminating light reflected by portions of the DMD other than micromirrors of the DMD, the filtering producing a filtered portion; and projecting the filtered portion using a projector lens;

in which a brightness of the illuminating light at least partially depends on a diameter of an aperture, a size of the overlap region is controlled by the diameter of the aperture, and the color filter is located at an illumination aperture stop between: the illuminating light and the DMD; or at a projection aperture stop between the DMD and a projected image.

12. The method of claim 11, wherein the illuminating light passes through the color filter if the color filter is located at the illumination aperture stop, and wherein the flat-state light cone passes through the color filter if the color filter is located at the projection aperture stop.

13. The method of claim 11, wherein the filtering filters red wavelengths with a low transmittance, and filters green wavelengths and blue wavelengths with a higher transmittance.

14. The method of claim 11, wherein the transmittance profile enables the color filter to filter different wavelengths of light with different transmittances.

15. The method of claim 11, wherein a size of the color filter at least partially depends on a maximum diameter of the aperture.

16. The method of claim 11, wherein, if the aperture has a maximum diameter, a transverse area of the portion outside the overlap region which is affected by the filtering is smaller than a transverse area of the portion inside the overlap region which is affected by the filtering.

17. The method of claim 11, wherein the illuminating light includes red light, blue light, and green light.

18. The method of claim 11, further comprising pulsing a red light source, a blue light source, and a green light source, so that the red light source is active at different times from the blue light source and the green light source, and the blue light source is active at different times from the green light source, the illuminating light including the light from the red, blue, and green light sources.

* * * * *